United States Patent
Agarwal et al.

(10) Patent No.: US 10,944,705 B2
(45) Date of Patent: *Mar. 9, 2021

(54) SYSTEMS AND METHODS FOR IMPROVED PROCESSING OF MESSAGE QUERIES

(71) Applicant: Google LLC, Mountain View, CA (US)

(72) Inventors: Shalini Agarwal, San Francisco, CA (US); Clarence Yung, San Francisco, CA (US); Han Seul Lee, Redwood City, CA (US); Mary Linnell, Mountain View, CA (US); Bikin Chiu, Mississauga (CA); Rodrigo Ipince, San Francisco, CA (US); Srinivas Vasudevan, Mountain View, CA (US); Syed Albiz, Kitchener (CA)

(73) Assignee: Google LLC, Mountain View, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/160,234

(22) Filed: Oct. 15, 2018

(65) Prior Publication Data

US 2019/0052589 A1 Feb. 14, 2019

Related U.S. Application Data

(63) Continuation of application No. 14/473,571, filed on Aug. 29, 2014, now Pat. No. 10,104,028.

(51) Int. Cl.
*H04L 12/58* (2006.01)
*G06Q 10/02* (2012.01)
(Continued)

(52) U.S. Cl.
CPC ............ *H04L 51/08* (2013.01); *G06F 3/0482* (2013.01); *G06F 3/04842* (2013.01);
(Continued)

(58) Field of Classification Search
CPC ..... G06Q 10/02; H04L 51/08; H04L 12/1895; H04L 51/04; H04L 51/24; G06F 3/0482; G06F 3/04842
(Continued)

(56) References Cited

U.S. PATENT DOCUMENTS

| 8,949,283 B1 | 2/2015 | Cornwell et al. |
| 9,124,546 B2 | 9/2015 | Sharp et al. |

(Continued)

OTHER PUBLICATIONS

Bernard Kerr and Eric Wilcox. "Designing remail: reinventing the email client through innovation and integration." (Apr. 2004). ACM, CHI '04 Extended Abstracts on Human Factors in Computing Systems, pp. 837-852. (Year: 2004).*

(Continued)

*Primary Examiner* — George Chen
*Assistant Examiner* — Hunter A Molnar
(74) *Attorney, Agent, or Firm* — Shumaker & Sieffert, P.A.

(57) ABSTRACT

A method of processing messages executes at a computing device having one or more processors and memory. The memory stores one or more programs configured for execution by the one or more processors. A first message for a user is analyzed for a structured content element. When found, content from a data source distinct from the message is obtained by executing an associated action. A first message display state is formed for the message comprising a message notification and the content. A messaging application user interface, comprising an electronic message list with a plurality of objects, is updated. Responsive to selection of a first object of the plurality of objects, the first object representing the first message, the user is enabled to toggle the first message display state between first and second display states, the second display state differing from the first by providing direct access to the first message.

20 Claims, 18 Drawing Sheets

(51) Int. Cl.
  *G06F 3/0482* (2013.01)
  *G06F 3/0484* (2013.01)
  *H04L 12/18* (2006.01)

(52) U.S. Cl.
  CPC ............ *G06Q 10/02* (2013.01); *H04L 51/04* (2013.01); *H04L 12/1895* (2013.01); *H04L 51/24* (2013.01)

(58) Field of Classification Search
  USPC ........................................................ 705/5
  See application file for complete search history.

(56) References Cited

U.S. PATENT DOCUMENTS

| | | | |
|---|---|---|---|
| 9,191,486 B2 | 11/2015 | Tseng et al. | |
| 9,503,509 B1 | 11/2016 | Hunt et al. | |
| 10,104,028 B2 | 10/2018 | Agarwal et al. | |
| 2005/0268237 A1* | 12/2005 | Crane | G06F 3/0481 715/732 |
| 2007/0067196 A1 | 3/2007 | Usui | |
| 2007/0198308 A1* | 8/2007 | Crean | G06Q 10/02 705/5 |
| 2008/0086703 A1* | 4/2008 | Flynt | G06F 3/0482 715/853 |
| 2009/0012824 A1* | 1/2009 | Brockway | G06Q 10/02 705/6 |
| 2011/0154338 A1 | 6/2011 | Ramanathaiah et al. | |
| 2011/0225257 A1 | 9/2011 | Tilden et al. | |
| 2011/0264685 A1* | 10/2011 | Cheng | G06Q 10/107 707/769 |
| 2012/0042024 A1* | 2/2012 | Kirshenboim | H04L 51/18 709/206 |
| 2012/0117507 A1* | 5/2012 | Tseng | H04M 1/72552 715/774 |
| 2012/0221474 A1 | 8/2012 | Eicher et al. | |
| 2013/0124238 A1 | 5/2013 | Burrows et al. | |
| 2014/0070945 A1 | 3/2014 | Dave et al. | |
| 2014/0149308 A1 | 5/2014 | Ming | |
| 2014/0164478 A1* | 6/2014 | Kleppmann | H04L 51/32 709/203 |
| 2015/0052035 A1 | 2/2015 | Caiman et al. | |
| 2015/0205782 A1 | 7/2015 | Subramanya et al. | |

OTHER PUBLICATIONS

Prosecution History from U.S. Appl. No. 14/473,571, dated May 31, 2017 through Jun. 11, 2018, 92 pp.

* cited by examiner

SYSTEMS AND METHODS FOR IMPROVED PROCESSING OF MESSAGE QUERIES

This application is a continuation of U.S. application Ser. No. 14/473,571, filed Aug. 29, 2014, which is incorporated herein by reference in its entirety.

TECHNICAL FIELD

The disclosure relates generally to processing electronic messages, and more specifically to providing multiple display states for objects representing messages.

BACKGROUND

Electronic messaging applications, such as email, convey various types of information to a recipient such as messages to and from others. In conventional messaging applications, it is not always possible to ascertain the relative importance of each message in an incoming box without first reviewing their full content. Moreover, even for relatively important messages, it is often necessary to open the message, that is review their full content, in order to derive necessary or useful information. Thus, a recipient of messages falls into a recurring pattern of not only checking for new messages, but also manually opening each message to obtain needed or useful information. What are needed in the art are systems and methods for assisting a recipient with obtaining useful information from messages more quickly and with fewer manual operations.

SUMMARY

Disclosed implementations address the above deficiencies and other problems associated with reviewing messages. In accordance with some implementations, a method of processing messages executes at a computing device having one or more processors and memory. The memory stores one or more programs configured for execution by the one or more processors. A message, addressed to a user, is analyzed for the presence of a first structured content element. Nonlimiting examples of structured content elements include those that identify the message as regarding an airline flight, those that identify the message as regarding a hotel reservation, those that identify the message as regarding a restaurant reservation, those that identify the message as regarding a purchase, those that identify the message as regarding a ticketed event, those that identify the message as including an attachment, those that identify the message as including an article or video, those that identify the message as regarding an invitation in which an RSVP is requested.

When the first structured content element is found in the message, a method is performed that comprises executing an action associated with the first structured content element thereby obtaining content from a first data source that is distinct from the message. In some embodiments, the first structured content element is an identification of an airline flight within the message and the data source is current flight information for the airline flight.

Typically, the message is analyzed by comparing the message, or portions of the message to multiple different structured content elements to determine if the message has any such structured content element. When the message is deemed to have or match one of the different structured content elements, action based on this particular different structured content element is taken in order to obtain content from a first data source that is distinct from the message. In some instances, these multiple different structured content elements are predetermined, stored content elements that are system defined, as opposed to user defined.

In some such embodiments, the first structured content element is in a plurality of structured content elements and the analyzing of the message comprises analyzing the message for the presence of each structured content element in the plurality of elements. When a match between the message and one of the different structured content elements is found, an action associated with that one structured content element is performed thereby obtaining content from a data source that is distinct from the message.

In some embodiments, a first display state of the object representing the message is formed when the first structured content element is found in the message. This first display state comprises a combination of a notification of the message and the content found based on the presence of the first structured content element.

In some embodiments, each structured content element in the plurality of content elements is associated with a different image stored in a second data source that is distinct from both the first data source and the message. In such embodiments, forming a first display state comprises including the image associated with the first structured content element (the structured element in the plurality of content elements that was deemed to have been found in the message) in the first display state of the object representing the message along with the combination of the notification of the message and the content. In an example of such an embodiment is one in which the message pertains to a flight reservation, the first data source is real time flight information for a flight in the flight reservation, and the second data source includes an image of the destination of a flight in the flight reservation.

Responsive to identifying the presence of the first structured content element in the message, a user interface for a messaging application is updated. The user interface comprises an electronic message list in an electronic message list panel. The electronic message list comprises a plurality of objects. Each respective object in the plurality of objects is visually distinct in the electronic message list. Each respective object in at least a subset of the plurality of objects comprises one or more electronic messages in a plurality of messages addressed to the user.

Responsive to user selection of a first object of the plurality of objects in the electronic message list panel, the first object representing at least the message, the system facilitates user initiated toggling of a display state of the object representing the message between the first display state and a second display state. The second display state differs from the first display state by providing direct access to the message. That is, whereas the first display state provides a notification of the message in addition to information that is not in the message, it is necessary to go to the second display state in order to see the message, or a direct link to the message.

In some embodiments, a task is associated with the first structured content element and the forming the first display state comprises including information for performing the task in the first display state of the object representing the message along with the combination of the notification of the message and the content. In some embodiments, the information for performing the task is in the form of a uniform resource locator. In some embodiments, the first structured content element identifies an airline flight and the task is an option to cancel the flight. In some embodiments, the first structured content element identifies a hotel or restaurant reservation and the task is an option to cancel the hotel or restaurant reservation, an option to confirm the hotel or restaurant reservation, an option to modify the hotel or restaurant reservation, or an option to view a map of a location of an address associated with the hotel or restaurant reservation. In some such embodiments, the forming the first display state comprises including a date associated with the hotel or restaurant reservation, where the date is retrieved from the message.

In some embodiments, the first structured content element is an airline flight with a flight origin and a flight destination, and the method further comprises obtaining a first image associated with the flight origin and a second image associated with the flight destination from a second data source that is distinct from (i) the message and (ii) the first data source and the forming the first display state comprises including the first image and the second image in the first display state of the object representing the message along with the combination of the notification of the message and the content. An example of content from the first data source in such embodiments is real time flight information.

In some embodiments, the first structured content element identifies a purchase of a product and the content is a picture of the product. In some embodiments, the first structured content element identifies a purchase of a product and the content is an estimated delivery date of the product. In some such embodiments, a task is associated with the first structured content element and the forming the first display state comprises including information for performing the task in the first display state of the object representing the message along with the combination of the notification of the message and the content. For example, in some embodiments, the task is viewing an original order for the product or viewing tracking details for a delivery of the product.

In some embodiments, the first structured content element identifies a ticketed event and the content is a picture associated with the ticketed event. In some such embodiments, a task is associated with the first structured content element and the forming the first display state comprises including information for performing the task in the first display state of the object representing the message along with the combination of the notification of the message and the content. In some embodiments, the task is viewing tickets for the ticketed events or viewing a map associated with a location of the ticketed event.

In some embodiments, the first structured content element is a link to an image and the content is a rendering of the image. In some embodiments, the first structured content element is a link to a video and the content is a frame from the video.

In some embodiments, the first object exclusively represents the message. That is, in such embodiments, the first object does not represent two or more messages. In other embodiments, the first object represents a plurality of messages and the object includes the first display state of the object representing the message.

Another aspect of the present disclosure provides a computing device comprising one or more processors, memory, and one or more programs stored in the memory. The one or more programs are configured for execution by the one or more processors. The one or more programs comprise instructions for analyzing a message, addressed to a user, for the presence of a first structured content element. When the first structured content element is found in the message, a method is performed that comprises (i) executing an action associated with the first structured content element thereby obtaining content from a first data source that is distinct from the message, and (ii) forming a first display state of the object representing the message. The first display state of the object representing the message comprises a combination of a notification of the message and the content. Responsive to identifying the presence of the first structured content element in the message, a user interface for a messaging application is updated. The user interface comprises an electronic message list in an electronic message list panel. The electronic message list comprises a plurality of objects. Each respective object in the plurality of objects is visually distinct in the electronic message list. Each respective object in at least a subset of the plurality of objects comprises one or more electronic messages in a plurality of messages addressed to the user. Responsive to user selection of a first object of the plurality of objects in the electronic message list panel, the first object representing at least the message, user initiated toggling of a display state of the object representing the message between first and second display states is facilitated. The second display state differs from the first display state by providing direct access to the message.

Another aspect of the present disclosure provides a non-transitory computer readable storage medium storing one or more programs configured for execution by a computing device having one or more processors and memory. The one or more programs comprise instructions for analyzing a message, addressed to a user, for the presence of a first structured content element. When the first structured content element is found in the message, a method is performed that comprises (i) executing an action associated with the first structured content element thereby obtaining content from a first data source that is distinct from the message, and (ii) forming a first display state of the object representing the message. The first display state of the object representing the message comprises a combination of a notification of the message and the content. Responsive to identifying the presence of the first structured content element in the message, a user interface for a messaging application is updated. The user interface comprises an electronic message list in an electronic message list panel. The electronic message list comprises a plurality of objects. Each respective object in the plurality of objects is visually distinct in the electronic message list. Each respective object in at least a subset of the plurality of objects comprises one or more electronic messages in a plurality of messages addressed to the user. Responsive to user selection of a first object of the plurality of objects in the electronic message list panel, the first object representing at least the message, user initiated toggling of a display state of the object representing the message between first and second display states is facilitated. The second display state differs from the first display state by providing direct access to the message.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1:
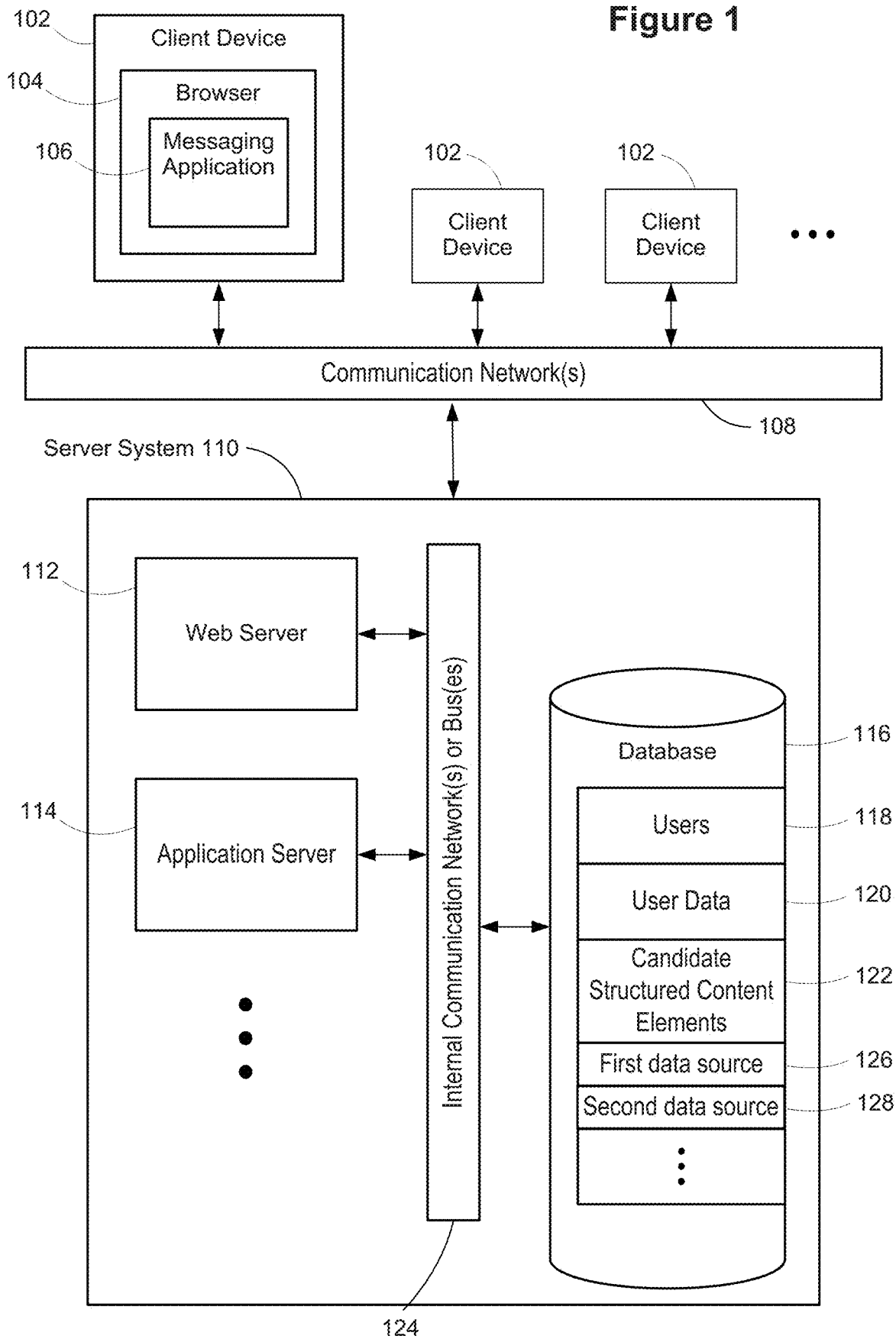
FIG. 1 illustrates a context in which some implementations operate.

FIG. 1 is a block diagram that illustrates the major components of some implementations. The various client devices 102 (also identified herein as computing devices) and servers 300 in a server system 110 communicate over one or more networks 108 (such as the Internet). In various embodiments, a client device 102 is a smart phone, a tablet computer, a laptop computer, a mobile computing device, a computing device of a vehicle of a user (e.g., an in-vehicle communications system, an in-vehicle entertainment system, an in-vehicle navigation system), a wearable apparatus of the user that includes a computing device (e.g., a watch of the user having a computing device, glasses of the user having a computing device, a wearable music player), desktop computer, or other computing device that has access to a communication network 108 and can run an electronic messaging application 106. In some implementations, the messaging application runs within a web browser 104.

In some implementations, the server system 110 consists of a single server 300. More commonly, the server system 110 includes a plurality of servers 300. In some implementations, the servers 300 are connected by an internal communication network of bus 124. The server system 110 includes one or more web servers 112, which receive requests from users (e.g., from client devices 102) and return appropriate information, resources, links, and so on. In some implementations, the server system 110 includes one or more application servers 114, which provide various applications, such as a messaging application 106. The server system 110 typically includes one or more databases 116, which store information such as web pages, a user list 118, various user information 120 (e.g., user names and encrypted passwords, user preferences, and so on), a plurality of predefined candidate task reminders 122, first data source 126 and second data source 128.

Figure 2:
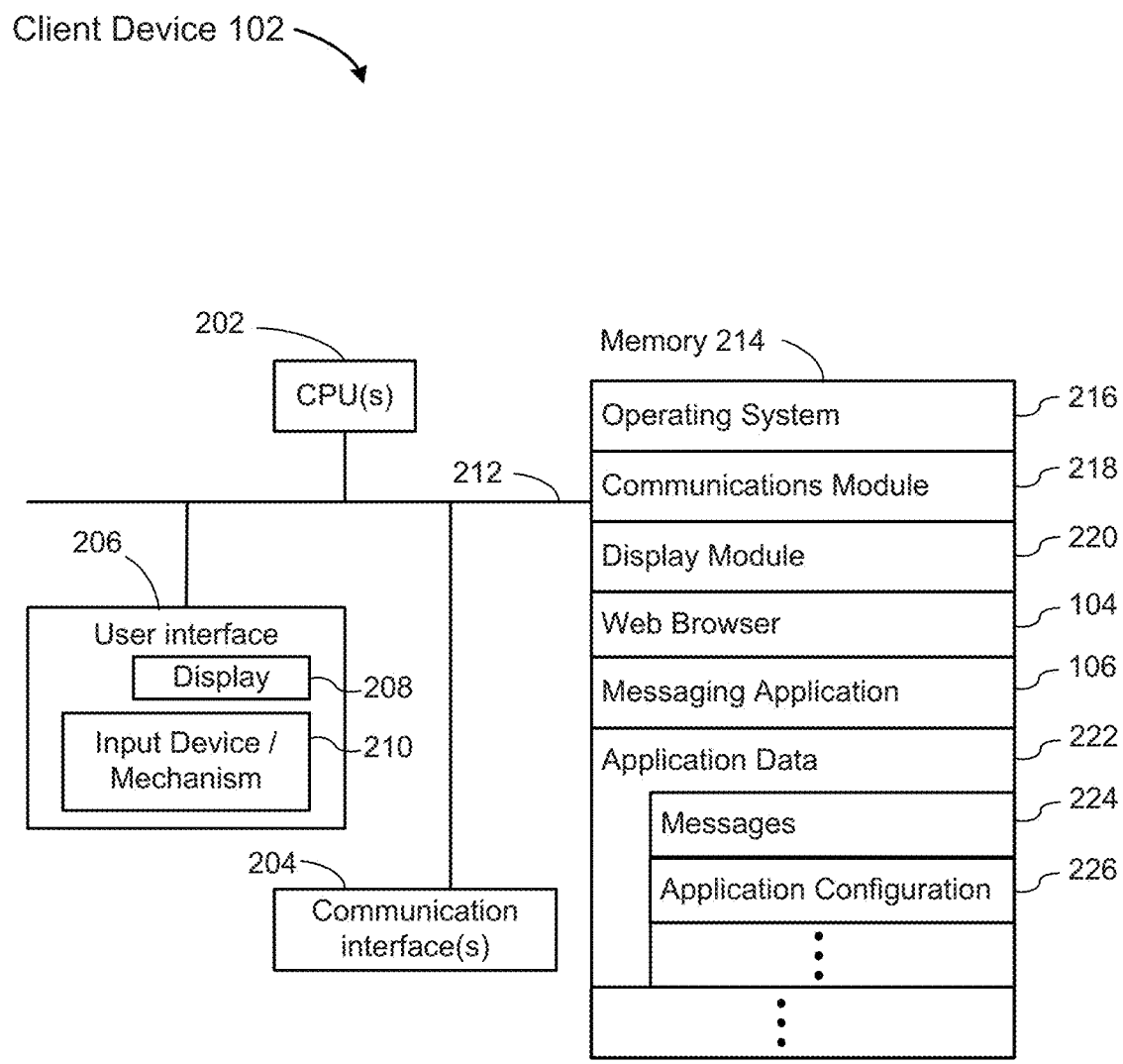
FIG. 2 is a block diagram of a client computing device according to some implementations.

FIG. 2 is a block diagram illustrating a client device 102 that a user uses to access a messaging application 106. A client device is also referred to as a computing device, which may be a tablet computer, a laptop computer, a smart phone, a desktop computer, a PDA, or other computing device than can run an electronic messaging application 106 and has access to a communication network 108. A client device 102 typically includes one or more processing units (CPUs) 202 for executing modules, programs, or instructions stored in memory 214 and thereby performing processing operations; one or more network or other communications interfaces 204; memory 214; and one or more communication buses 212 for interconnecting these components. In some embodiments, the communication buses 212 include circuitry (sometimes called a chipset) that interconnects and controls communications between system components. A client device 102 includes a user interface 206 comprising a display device 208 and one or more input devices or mechanisms 210. In some implementations, the input device/mechanism includes a keyboard and a mouse; in some implementations, the input device/mechanism includes a "soft" keyboard, which is displayed as needed on the display device 208, enabling a user to "press keys" that appear on the display 208.

In some implementations, the memory 214 includes high-speed random access memory, such as DRAM, SRAM, DDR RAM or other random access solid state memory devices. In some implementations, memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communications module 218, which is used for connecting the client device 102 to other computers and devices via the one or more communication network interfaces 204 (wired or wireless) and one or more communication networks 112, such as the Internet, other wide area networks, local area networks, metropolitan area networks, and so on;
- a display module 220, which receives input from the one or more input devices 210, and generates user interface elements for display on the display device 208;
- a web browser 104, which enables a user to communicate over a network 108 (such as the Internet) with remote computers or devices;
- a messaging application 106, which enables the user to send and receive electronic messages. In some implementations, the messaging application is an email application. In some implementations, the messaging application is an instant messaging application. In some implementations, the messaging application 106 runs within the web browser 104 as illustrated in FIG. 1. In some implementations, the messaging application 106 runs independently of a web browser 104 (e.g., a desktop application). An example of an electronic messaging application is illustrated below in FIGS. 4A-4K; and
- application data 222, which is used by the messaging application 106. The application data comprises messages 224 (e.g., email messages or instant messages). In some embodiments, the application data 222 includes application configuration data 226, such as user preferences, user history, geographic information about the user, or the state of configuration options.

Each of the above identified executable modules, applications, or sets of procedures may be stored in one or more of the previously mentioned memory devices and corresponds to a set of instructions for performing a function described above. The above identified modules or programs (e.g., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, in some embodiments, the memory 214 stores additional modules or data structures not described above.

Although FIG. 2 shows a client device 102, FIG. 2 is intended more as a functional description of the various features that may be present rather than as a structural schematic of the implementations described herein. In practice, and as recognized by those of ordinary skill in the art, items shown separately could be combined and some items could be separated.

Figure 3:
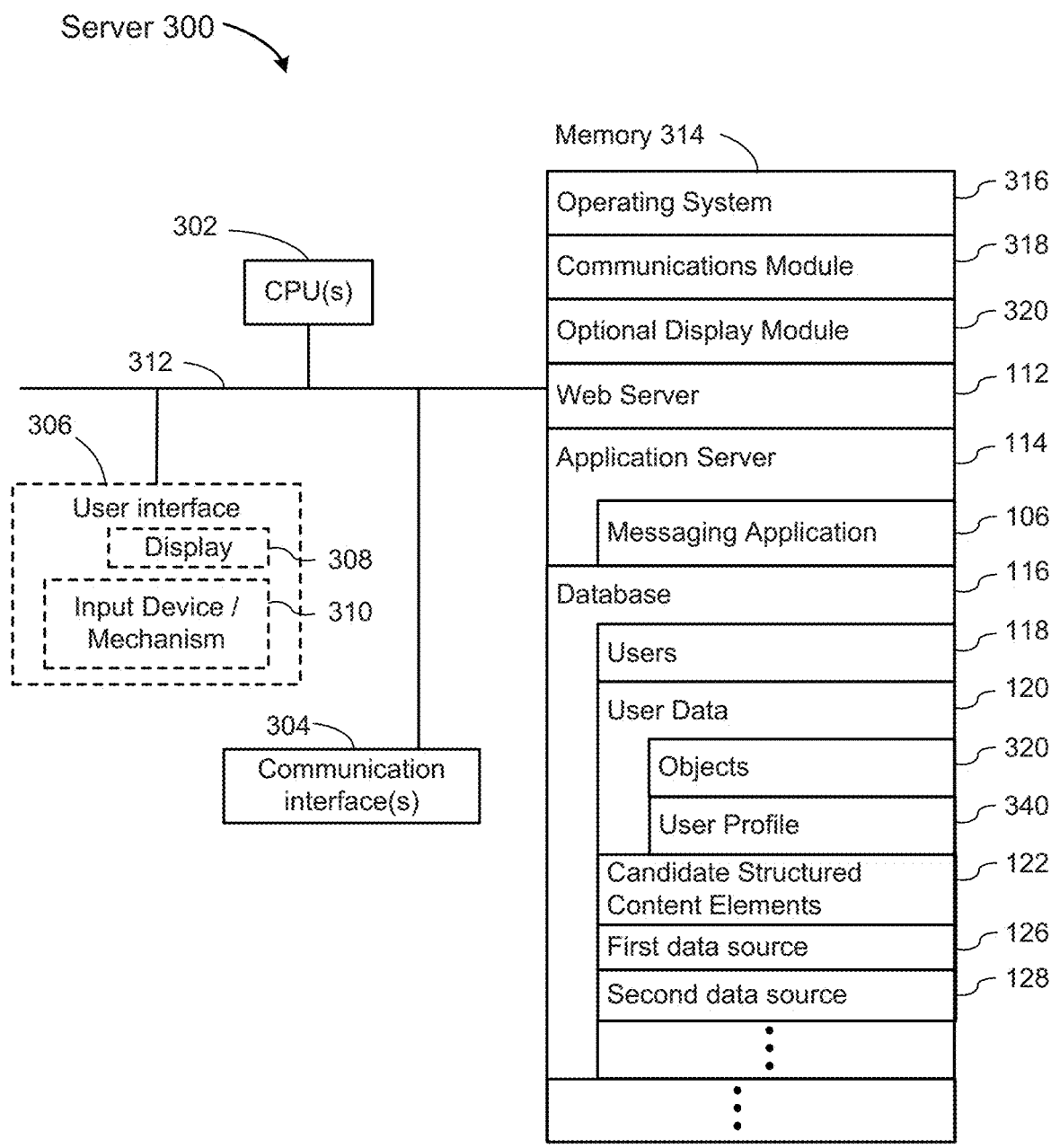
FIG. 3 is a block diagram of a server according to some implementations.

FIG. 3 is a block diagram illustrating a server 300 that is used in a server system 110 in accordance with some embodiments. A typical server system includes many individual servers 300, which, in some instances, numbers in the hundreds or thousands. A server 300 typically includes one or more processing units (CPUs) 302 for executing modules, programs, or instructions stored in the memory 314 and thereby performing processing operations; one or more network or other communications interfaces 304; memory 314; and one or more communication buses 312 for interconnecting these components. In some embodiments, the communication buses 312 include circuitry (sometimes called a chipset) that interconnects and controls communications between system components. In some implementations, a server 300 includes a user interface 306, which may include a display device 308 and one or more input devices 310, such as a keyboard and a mouse.

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternately the non-volatile memory device(s) within memory 314, comprises a non-transitory computer readable storage medium. In some implementations, the memory 314, or the computer readable storage medium of memory 314, stores the following programs, modules, and data structures, or a subset thereof:

- an operating system 316, which includes procedures for handling various basic system services and for performing hardware dependent tasks;
- a communications module 318, which is used for connecting the server 300 to other computers via the one or more communication network interfaces 304 (wired or wireless), an internal network or bus 124, or other communication networks 108, such as the Internet, other wide area networks, local area networks, metropolitan area networks, and so on;
- an optional display module 320, which receives input from one or more input devices 310, and generates user interface elements for display on a display device 308;
- one or more web servers 112, which receive requests from client device 102, and returns responsive web pages, resources, or links. In some implementations, each request is logged in the database 116;
- one or more application servers 114, which provide various applications (such as an email or other electronic messaging application) to client devices 102. In some instances, applications are provided as a set of web pages, which are delivered to client devices 102 and displayed in a web browser 104. The web pages are delivered as needed or requested. In some instances, an application is delivered to a client device 102 as a download, which is installed and run from the client device 102 outside of a web browser 104;
- one or more databases 116, which store various data used by the modules or programs identified above. In some implementations, the database 116 includes a list of authorized users 118 (e.g., including user names, encrypted passwords, and other relevant information about each user). The database 116 also stores user specific data 120 that is used by one or more of the applications provided by the application server. For example, some implementations store the electronic messages 224 for each user. For example, some implementations store objects 320 for each user. As another example, some implementations store user profiles 340 associated with users. In some implementations, the database 116 includes candidate structured content elements 122. In some implementations, the database 116 includes first data source 126 and second data source 128.

Candidate task reminders 122 and/or 228 are in any form suitable for reminding a user of a task. Moreover, it will be appreciated that FIGS. 2 and 3 collectively represent the server 300 and the client device 102 as including predefined candidate task reminders. In some implementations, only the server 300 stores predefined candidate task reminders. In some implementations, only the client device 102 stores predefined candidate task reminders. In some implementations, both the server 300 and the client device 102 stores predefined candidate task reminders. In some such implementations, the server 300 and the client device 102 store the same predefined candidate task reminders. In some such implementations, the server 300 stores a first set of predefined candidate task reminders and the client device 102 stores a second set of predefined candidate task reminders, and there is no overlap between the first set of predefined candidate task reminders and the second set of predefined candidate task reminders, partial overlap between the first set of predefined candidate task reminders and the second set of predefined candidate task reminders, or complete overlap between the first set of predefined candidate task reminders and the second set of predefined candidate task reminders. In one embodiment, the first set of predefined candidate task reminders is defined by a source distinct from the user, and the second set of predefined candidate task reminders is defined by a particular user associated with a particular client device 102.

Each of the above identified elements in FIG. 3 may be stored in one or more of the previously mentioned memory devices. Each executable program, module, or procedure corresponds to a set of instructions for performing a function described above. The above identified modules or programs (e.g., sets of instructions) need not be implemented as separate software programs, procedures or modules, and thus various subsets of these modules are combined or otherwise re-arranged in various implementations. In some implementations, the memory 314 stores a subset of the modules and data structures identified above. Furthermore, in some embodiments, the memory 314 stores additional modules or data structures not described above.

Although FIG. 3 illustrates a server 300, FIG. 3 is intended more as functional illustration of the various features that may be present in a set of one or more servers rather than as a structural schematic of the implementations described herein. In practice, and as recognized by those of ordinary skill in the art, items shown separately could be combined and some items could be separated. The actual number of servers used to implement these features, and how features are allocated among them, will vary from one implementation to another, and depends in part on the amount of data traffic that the system must handle during peak usage periods as well as during average usage periods.

As illustrated in FIGS. 2 and 3, the functionality for an electronic messaging application may be shared between a client device 102 and a server system 110. In some implementations, after the electronic messaging application is installed on a client device 102, the majority of the subsequent processing occurs on the client device. In other implementations, the majority of the processing and data storage occurs at a server 300, and the client device 102 uses a web browser 104 to view and interact with the data. One of skill in the art recognizes that various allocations of functionality between the client device 102 and the server system 110 are possible, and some implementations support multiple configurations (e.g., based on user selection).

Figure 4A:
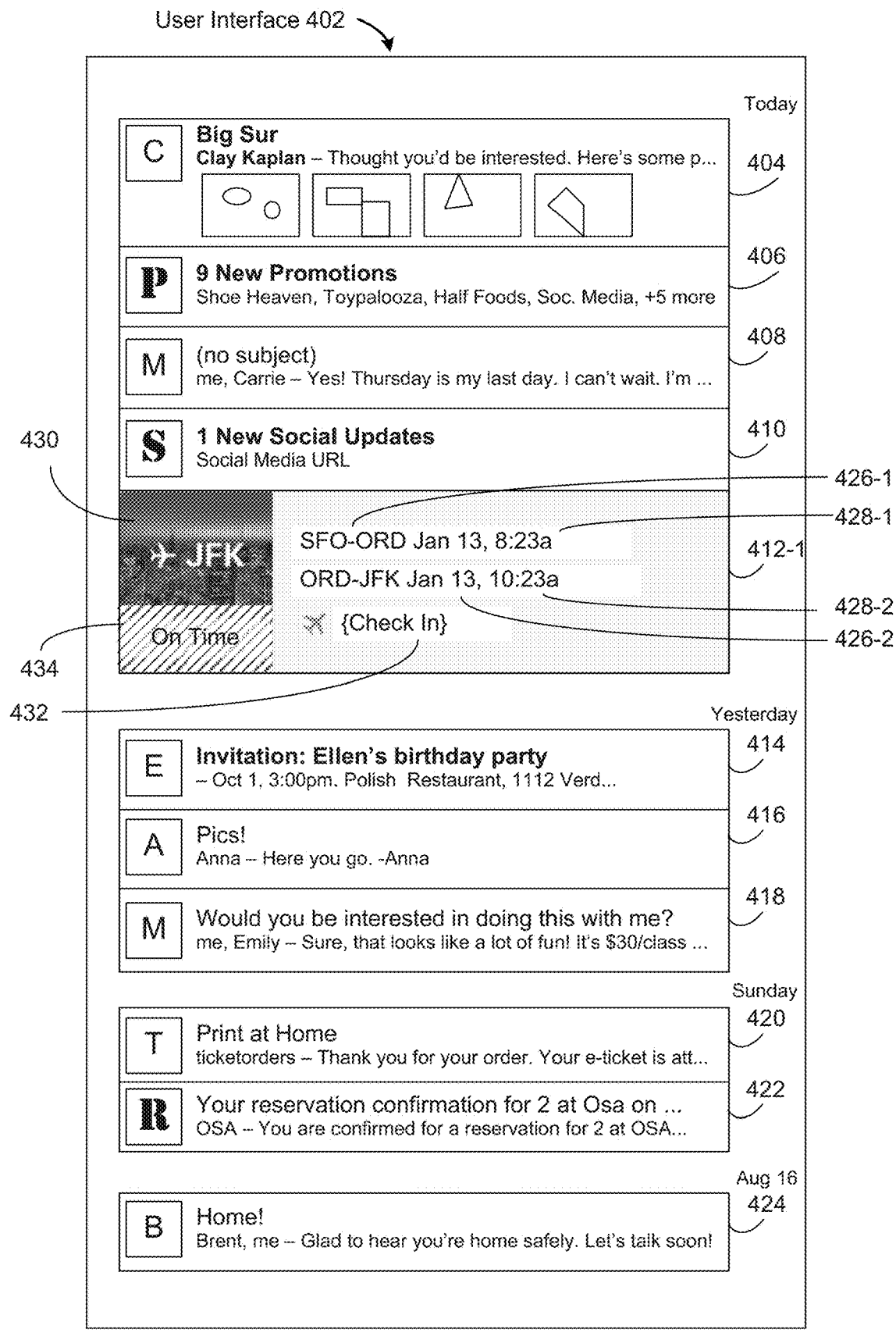
FIGS. 4A-4K illustrate aspects of a user interface providing multiple display states for objects representing messages in accordance with some implementations.

FIG. 4A illustrates features of a messaging application that provide multiple display states for objects representing messages in accordance with some implementations. FIG. 4A illustrates user interface 402, which is displayed as part of a messaging application (e.g., an email application). User interface depicts a plurality of objects in a list format. In this example, each row in the list represents a separate object. Examples of objects include messages, (e.g., messages 404, 408, and 414-424) and message clusters (e.g., 406, 410). Other forms of objects are possible too, such as tasks. The objects are all for a user associated with the user interface 402. In some embodiments, individual messages (e.g., messages 404, 408, and 414-424) are message threads, message conversations, or messages that are addressed to one or more users, including the user uniquely associated with the user interface 402.

In FIG. 4A, the user interface 402 is, in particular, shown to comprise at least two objects that are message clusters, cluster 406 and cluster 410. Cluster 406 is a group of electronic messages having a collective association, namely promotional material (e.g., advertisements for retail sales, newsletters from stores). As can be seen in FIG. 4A, cluster 406 comprises nine new electronic messages, and cluster 410 comprises one new electronic message. In some embodiments, a new electronic message refers to a message that has not been viewed, opened, acknowledged or read by the user of the electronic messaging application. Message clusters are disclosed further in U.S. patent application Ser. No. 14/145,005, entitled "Systems and Methods for Throttling Display of Electronic Messages," filed Dec. 31, 2013, and U.S. patent application Ser. No. 14/139,205, entitled "Systems and Methods for Clustering Electronic Messages," filed Dec. 23, 2013, each of which is hereby incorporated by reference herein in its entirety.

Continuing to refer to FIG. 4A, a method of providing multiple display states for objects representing messages is disclosed in more detail. A message (not shown), addressed to a user, is analyzed for the presence of a first structured content element. When the first structured content element is found in the message, an action associated with the first structured content element is performed thereby obtaining content from a first data source that is distinct from the message. For instance, consider the case in which the first structured content element is an identification of an airline flight and the data source is current flight information for the airline flight. When a message is determined to have the first structured content element, the airline flight, this structured information is used as a basis to obtain the current flight information from a data source that is distinct from the message, such as first data source 126. For instance, the airline flight from the first email is inserted into a search expression or structured query that is used to search the data source for current information regarding the flight. In one example, the first structured element refers to flight 1451 from SFO to ORD, and the expression 1451 from the message is used to obtain the current departure time for the flight from a data source that is distinct from the message.

In some embodiments, when the first structured content element is found in the message, an action associated with the first structured content element is performed thereby obtaining content from multiple data sources, such as the message that includes the first structured content element, one or more databases, and/or one or more other messages received by the user. For instance, in some embodiments, information from across multiple messages is obtained. As one example, information is obtained from one message that pertains to an order confirmation and additional information is obtained from another message that pertains to order shipment. As another example, information is obtained from one message that pertains to a hotel reservation confirmation and additional information is obtained from another message that pertains to cancellation of the hotel reservation.

When a structured content element is found in the message and content received from the data source distinct from the message, a first display state of a first object representing at least the message is formed. The first display state of the first object comprises a combination of a notification of the message and the content that was retrieved from a data source that is distinct from the message (e.g., the current departure time for the flight). It will be appreciated that the notification of the message is not the message itself, nor does it provide direct access to the message. The user interface 402 is updated to reflect the addition of the object representing the message. In this example, the message (not shown) included two flights, and thus information on departure time for both flights is provided in an object 412 that represents the message. As FIG. 4A illustrates, the first display state of object 412, denoted state 412-1, includes a synopsis 426 of each flight from the message, and information on departure time 428 for both flights from the first data source that is distinct from the message. Also provided in the first display state of object 412 is an indication 434 of whether the flight to JFK is on time, which is obtained from, or derived from the information in, the first data source that is distinct from the message (e.g., data source 126).

It will be appreciated that data can be obtained from any number of data sources distinct from the message to create the first display state of the object representing the message in addition to, or instead of, information from the message itself. Accordingly, in some embodiments, the identification of the first structured content element is used as a basis for obtaining content from more than one data source that is distinct from the analyzed (first) message. For instance, in the message that forms the basis of creating object 412 of FIG. 4A, the structured content element relates to two flights. Accordingly, current information on flight status 428 is obtained from a first data source (e.g., first data source 126 of FIGS. 1 and 3) and a hero image 430 associated with the designation of one of the flights, JFK, is obtained from a second data source (e.g., second data source 128 of FIGS. 1 and 3).

In some instances, a task is also inferred from the message and added to the object representing the message. Ways to infer a task from an electronic message are disclosed in U.S. patent application Ser. No. 14/161,368, entitled "Identifying Tasks in Messages," filed Jan. 22, 2014, which is hereby incorporated by reference herein in its entirety. In some embodiments a message is processed in order to determine whether the message includes a task by determining, for each respective predefined candidate task in a plurality of predefined tasks, whether there is a match between the predefined candidate task and all or a portion of the respective message. In some embodiments, this match between the predefined candidate task and all or a portion of the respective message includes natural language processing of the all or a portion of the respective message as disclosed in U.S. patent application Ser. No. 14/161,368, entitled "Identifying Tasks in Messages," filed Jan. 22, 2014, which is hereby incorporated by reference herein in its entirety. In some embodiments, each predefined candidate task is a rule, heuristic, phrase, or other expression that is matched or applied against respective messages addressed to a user (e.g., the incoming message) to see if there is a match between the predefined candidate task and all or a portion of the respective message. In some embodiments, a predefined candidate task in the plurality of candidate tasks is from a source other than (external to, independent of) the user. For instance, in some embodiments there is a library of standard or common predefined candidate task formats that are provided for matching. When a match is deemed to have been found, the object corresponding to the message that had a match is updated to include the task derived from the corresponding message. In some alternative embodiments, the task is determined from the identity of the structured content element found in the message. Thus, in the case of FIG. 4A, the task is facilitating flight check in 432. When the user clicks on or otherwise selects task affordance 432, information on how to check in to a flight referenced in the message, or a URL for checking into the flight referenced in the message is provided.

Figure 4B:
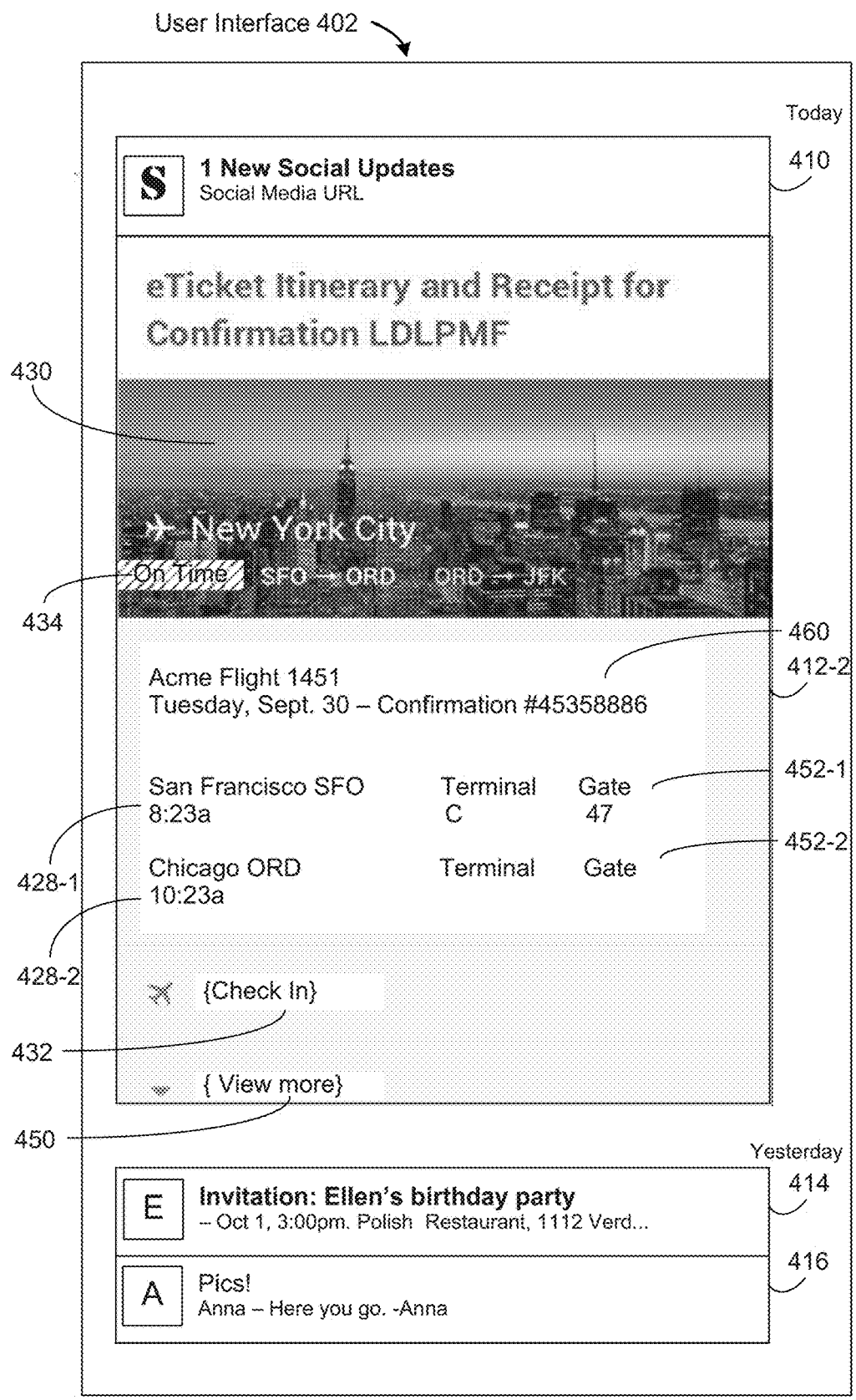

Responsive to user selection of object 412, user initiated toggling of the display state of the object 412 between the first display state (412-1) and a second display state (412-2) is facilitated. FIG. 4A illustrates the first display state 412-1 of object 412 and FIG. 4B illustrates the second display state 412-2 of object 412. The second display state differs from the first display state by providing direct access 450 to the message. Further, as FIGS. 4A and 4B illustrate, the first display state 412-1 is a collapsed display state and the second display state 412-2 is an expanded display state. In other words, the first display state 412-1 provides less information than the second display state 412-2. More generally, in typical embodiments, the information provided by the second display state of the object representing the message is different than the information provided by the first display state of the object representing the message.

As FIG. 4B illustrates, the second display state of object 412, denoted state 412-2, includes terminal and gate information 452 of each flight in the message. Such information is from a source that is distinct from the message. The second display state 412-2 also has information on departure time 428 for each such flight from a data source that is distinct from the message. Also provided in the second display state 412-2 of object 412 is an indication 434 as to whether the flight to JFK is on time. Further, the second display state 412-2 includes updated information on the flight departure time 428 of the flight from SFO and the flight from ORD and a hero image 430 associated with the final destination, JFK, that is obtained from a data source that is distinct from the underlying message (e.g., second data source 128 of FIGS. 1 and 3). Display state 412-2 also displays a confirmation number 460 for the flights. In addition to being in an expanded format, display state 412-2 of FIG. 4B differs from display state 412-1 of FIG. 4A for object 412 by including either the text of, or a direct link 450 to the message that included the first structured content element and that is represented by object 412.

In some embodiments, the expanded display state 412-2 of FIG. 4B is reached by selection of any point within the display space occupied by display state 412-1 in FIG. 4A other than affordance 432. In some embodiments, special action, such as swiping or double clicking or tapping within the screen area occupied by display state 412-1 is performed to reach display state 412-2. In some embodiments it is reached by selection of hero image 430 of FIG. 4A. In some embodiments it is reached by selection of a designated "expand" affordance that is not shown in FIG. 4A.

Turning once again to FIG. 4B it is seen that, responsive to user selection of the collapsed display state 412-1, for example by any of the ways described above, the collapsed display state 412-2 of object 412 is replaced with an expanded state 412-2 by pushing any objects in the list of objects that are above the object 412 (e.g., objects 404, 406, 408, and 410) up and pushing any objects in the list of objects that are below the object 412 (e.g., objects 414, 416, 418, 420, 422, and 424) down. In alternative embodiments, the expanded state 412-2 of object 412 occupies the entire portion of user interface 402 that is devoted to listing objects, such that no other object are listed when the expanded state 412-2 of object 412 is displayed.

In some embodiments, the collapsed display state 412-1 of FIG. 4A, is reached from the expanded display state 412-2 of FIG. 4B by selection of any point within the display space occupied by display state 412-2 in FIG. 4B other than affordances 432 and 450. In some embodiments, special action, such as swiping or double clicking or tapping within the display state 412-2 is performed to reach display state 412-1. In some embodiments it is reached by selection of hero image 430 of FIG. 4B. In some embodiments it is reached by selection of a designated "collapse" affordance that is not shown in FIG. 4B. Responsive to user designated selection to return to the collapsed state 412-1, the expanded state 412-2 of object 412 is once again replaced with the original collapsed state 412-1 of the object by pushing any objects in the list of objects that are above object 412 (e.g., objects 404, 406, 408, and 410) down and pushing any objects in the list of objects that are below object 412 (e.g., objects 414, 416, 418, 420, 422, and 424) up in the user interface.

Figure 4C:
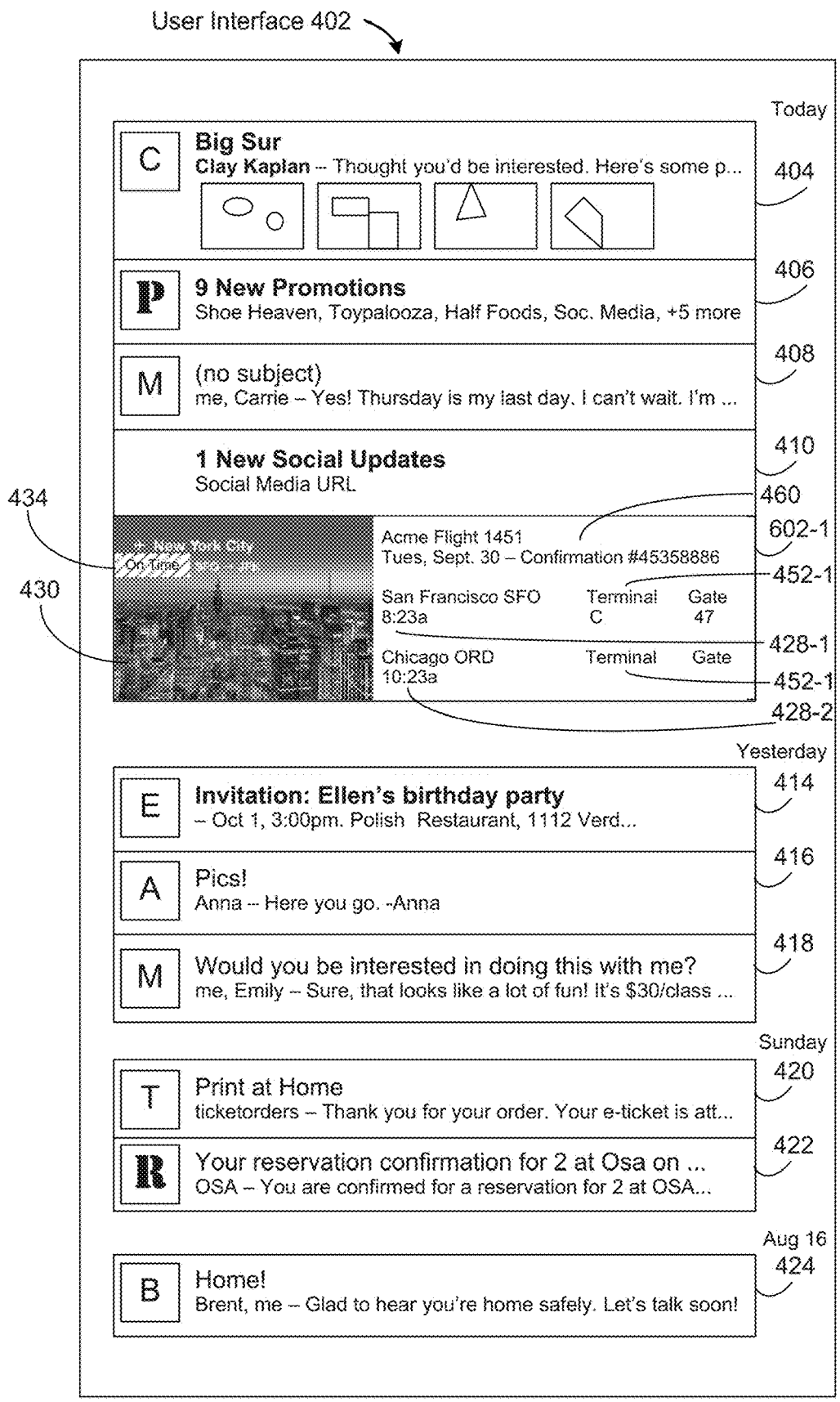

FIG. 4C illustrates the collapsed state 602-1 of the first object representing a message that included a structured content element for flights in accordance with another embodiment. Accordingly, display state 602-1 is an alternative to display state 412-1 of FIG. 4A. Display state 602-1 includes information on departure time 428 for both flights from the first data source that is distinct from the message. Also provided in the display state 602-1 is an indication 434 of whether the flight to JFK is on time, which is obtained from, or derived from the information in, the first data source that is distinct from the message (e.g., data source 126). Display state 602-1 also includes gate information 452 and a flight confirmation number 460.

Figure 4D:
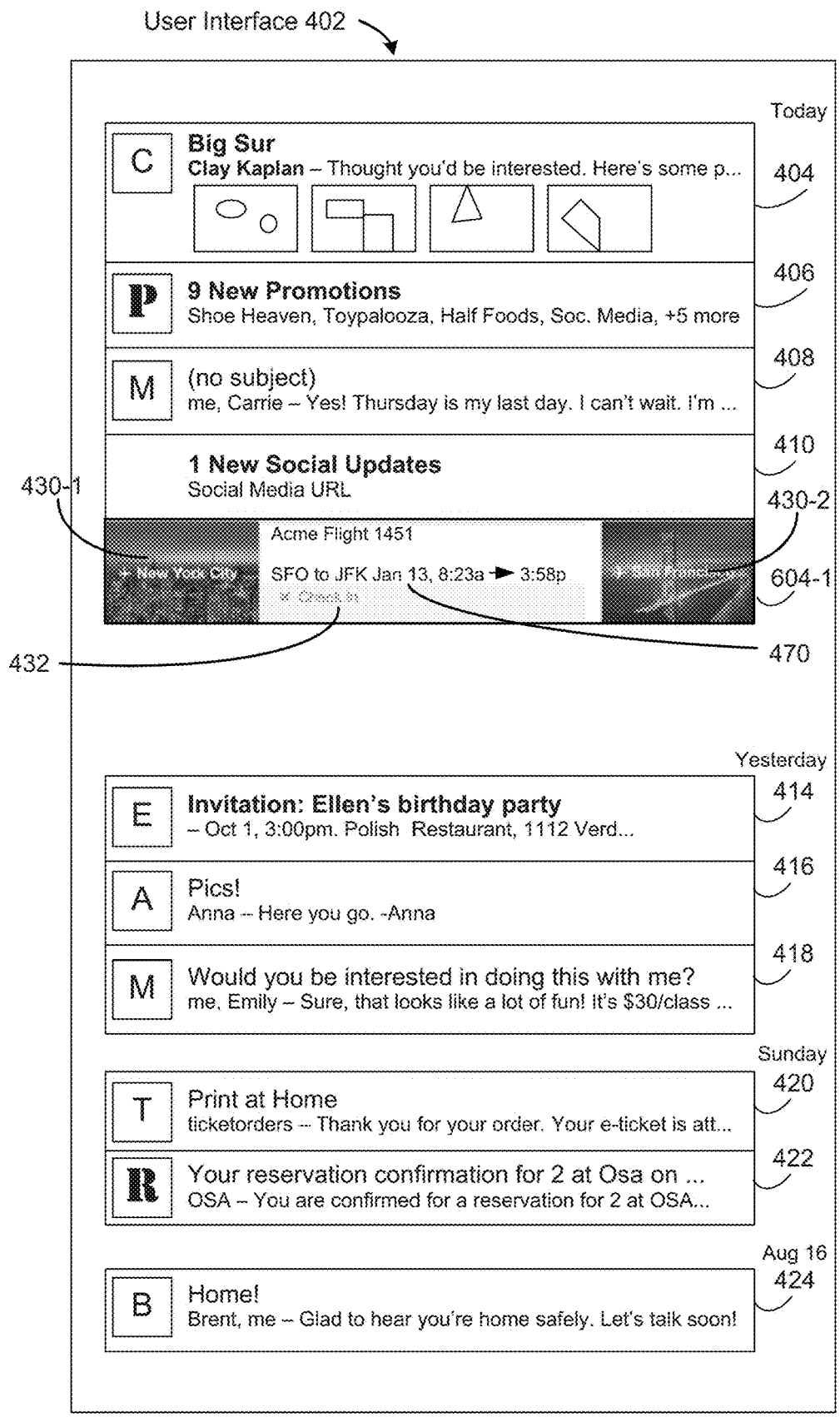

FIG. 4D illustrates the collapsed state 604-1 of the first object representing a message that included a structured content element for flights in accordance with still another embodiment. Accordingly, display state 604-1 is an alternative to display state 412-1 of FIG. 4A. Display state 604-1 includes task affordance 432. When the user selects task affordance 432, information on how to check in to a flight referenced in the message, or a URL for checking into the flight referenced in the message, is provided. Display state 604-further includes a hero image 430-1 representing the flight origination city and a separate hero image 430-2 representing flight destination city, both of which are taken from a source that is distinct from the message. Display state 604-1 further includes updated flight departure and arrival times 470 for the flight that is obtained from a source that is independent of the message.

Figure 4E:
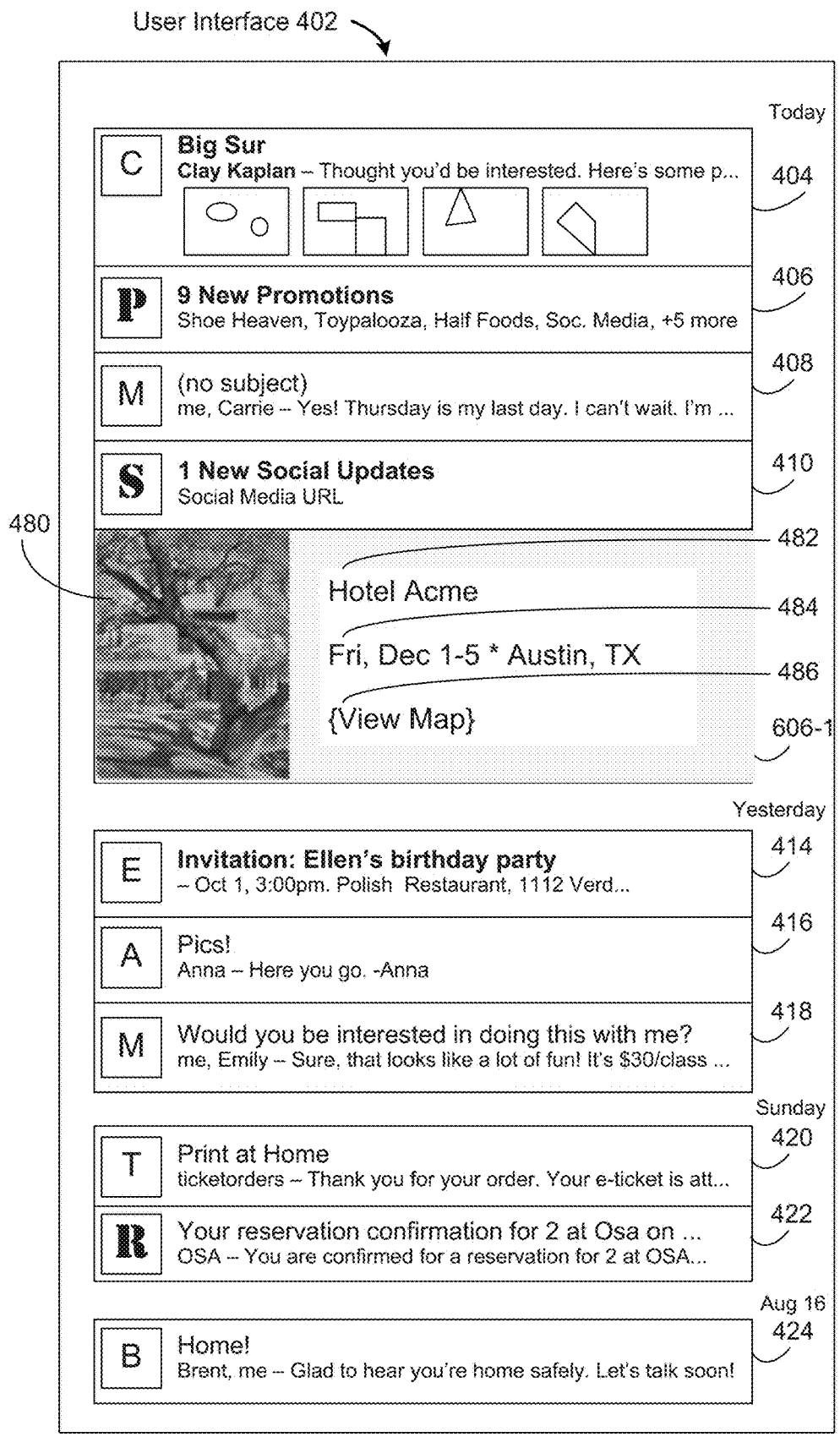
Figure 4F:
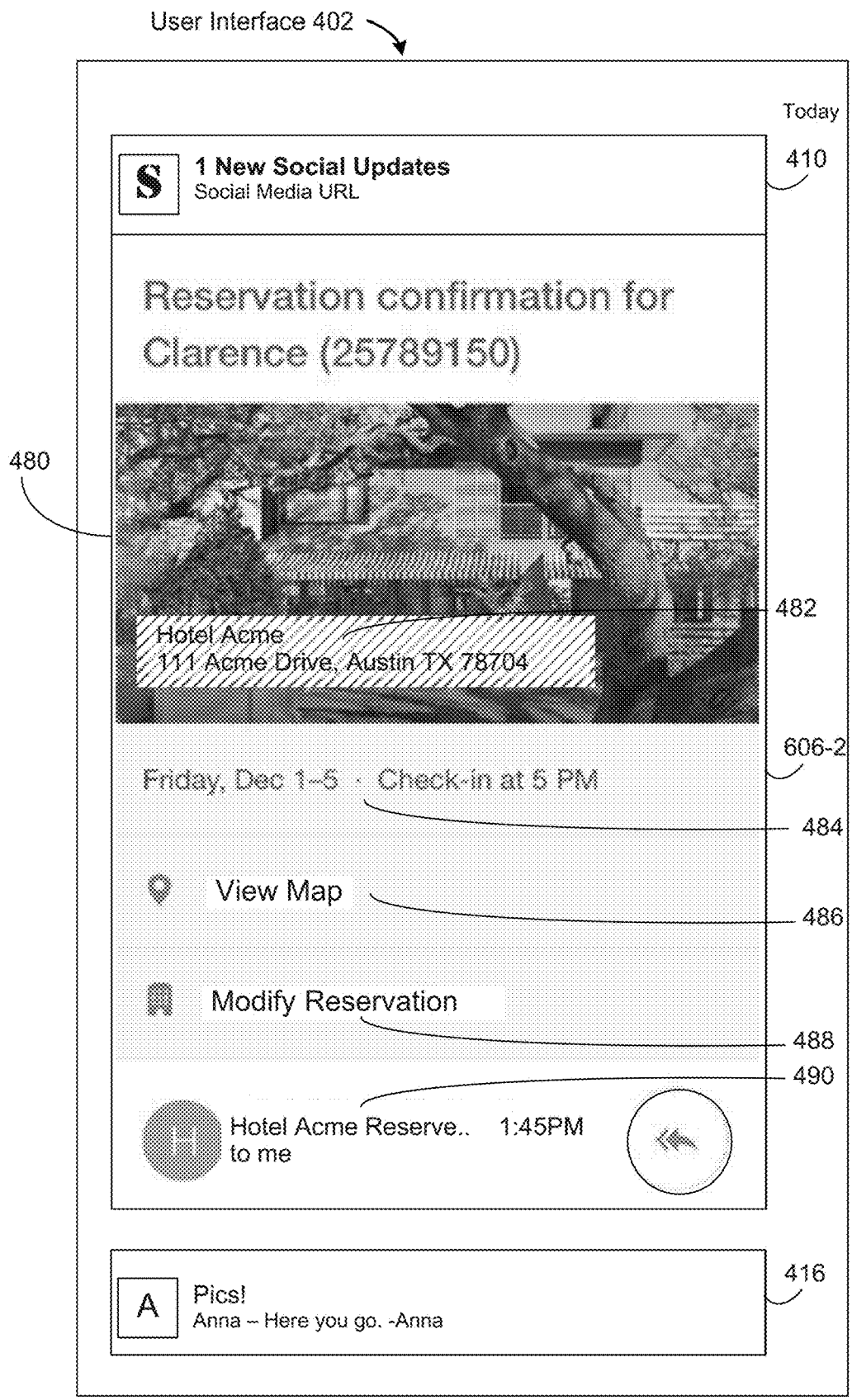

FIG. 4E illustrates a collapsed display state 606-1 of an object representing a message (not shown), addressed to a user, in which the first structured content element pertains to a hotel reservation. When the first structured content element is found in the message, an action associated with the first structured content element is performed thereby obtaining content from a first data source that is distinct from the message. For instance, in the case of FIG. 4E, the first structured content element is an identification of a hotel reservation and the data source is an image of the hotel taken from a source distinct from the message. Here, when the message is determined to have the first structured content element, the hotel reservation, this structured information (the name of the hotel) is used as a basis to obtain the image of the hotel from a data source that is distinct from the message, such as first data source 126. Accordingly, as described before, when a structured content element is found in a message and content received from the data source distinct from the message, a first display state of a first object representing at least the message is formed. The first display state of the first object comprises a combination of a notification of the message and the content that was retrieved from a data source that is distinct from the message (e.g., the picture of the hotel). The user interface 402 is updated to reflect the addition of the object representing the message. As FIG. 4E illustrates, the first display state of object 606, denoted state 606-1, includes the name of the hotel 482, the dates 484 covered by the reservation, and a link 486 to a map of the hotel. Further a picture of the hotel 480 from a source distinct from the message is provided. FIG. 4F illustrates a corresponding second expanded display state 606-2 of object 606 in which additional information such as the hotel address 682, the message 490, and tasks associated with hotel reservations (viewing a map of the hotel 486 and modifying the hotel reservation 488) are depicted. In some embodiments, such tasks are identified based on the identity of the structured content item identified in the first email (a hotel reservation).

Figure 4G:
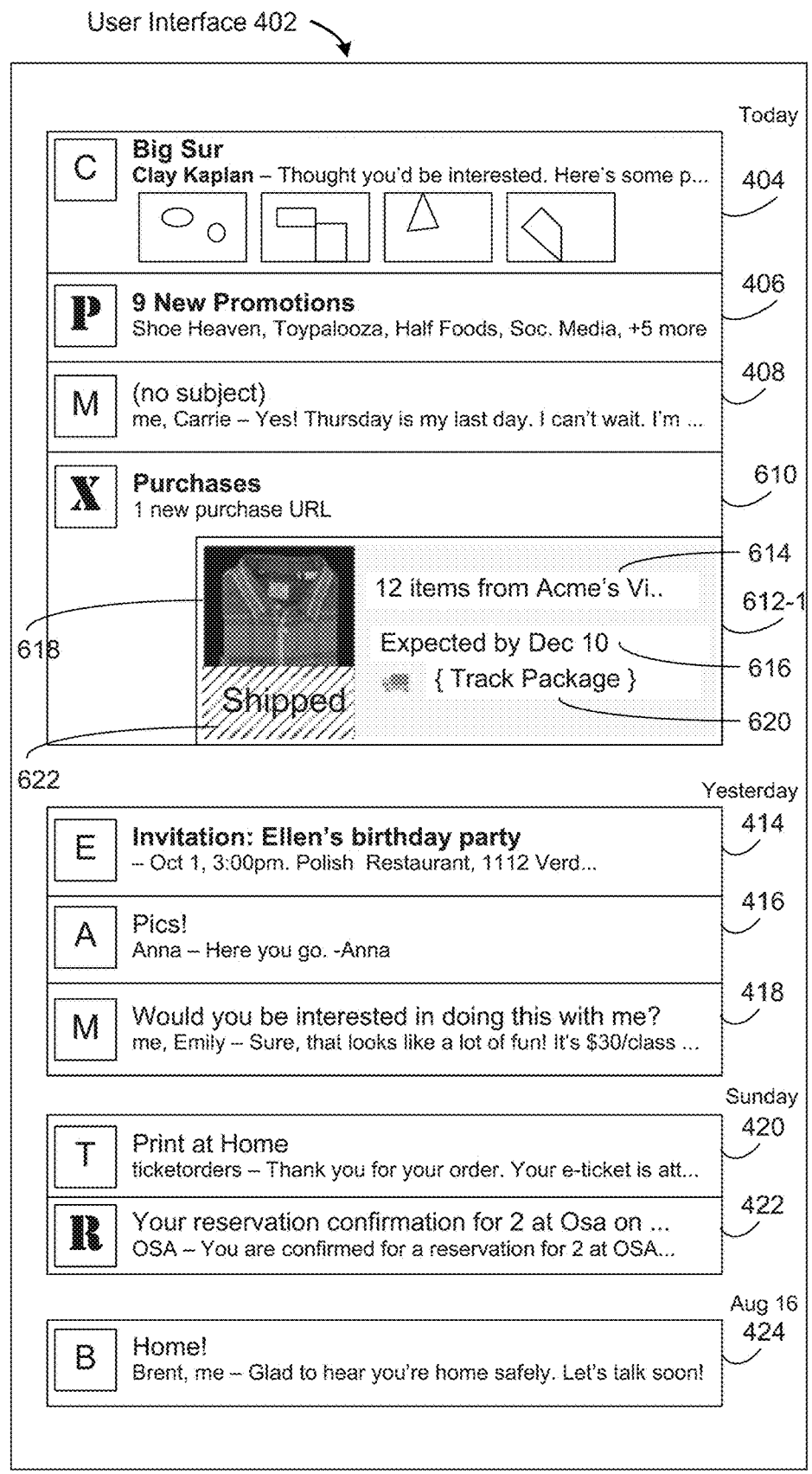

Prior examples provided object display states for messages that were not incorporated into clusters. As indicated before, it is possible for a message to be clustered in to a cluster using, for example the techniques disclosed in U.S. patent application Ser. No. 14/145,005, entitled "Systems and Methods for Throttling Display of Electronic Messages," filed Dec. 31, 2013, and U.S. patent application Ser. No. 14/139,205, entitled "Systems and Methods for Clustering Electronic Messages," filed Dec. 23, 2013, each of which is hereby incorporated by reference herein in its entirety. FIG. 4G illustrates an example in which the message has been clustered into a purchase cluster 610. That is, the message is deemed to not only include a first structured content element that warrants generating an object with collapsed and expanded display states as in other embodiments, it also is deemed to belong to purchase cluster 610. FIG. 4G represents the use case in which the message has been clustered into the purchase cluster 610 but has not been read yet. When this is the case, the collapsed display state 612-1 of an object 612 representing the message is displayed in the purchase cluster object 610. The collapsed display state 612-1 includes the standard components of the collapsed display state of an object representing a message that includes a first structured content item pertaining to purchases, in accordance with this example, including the number of items purchase 614, expected delivery date 616, an image 618 of an item purchased (where the image is optionally from a source distinct from the message), the task of tracking 620 the package that contains the purchase, and an indication 622 of the state of shipment of the package (again from a source distinct from the message).

Figure 4H:
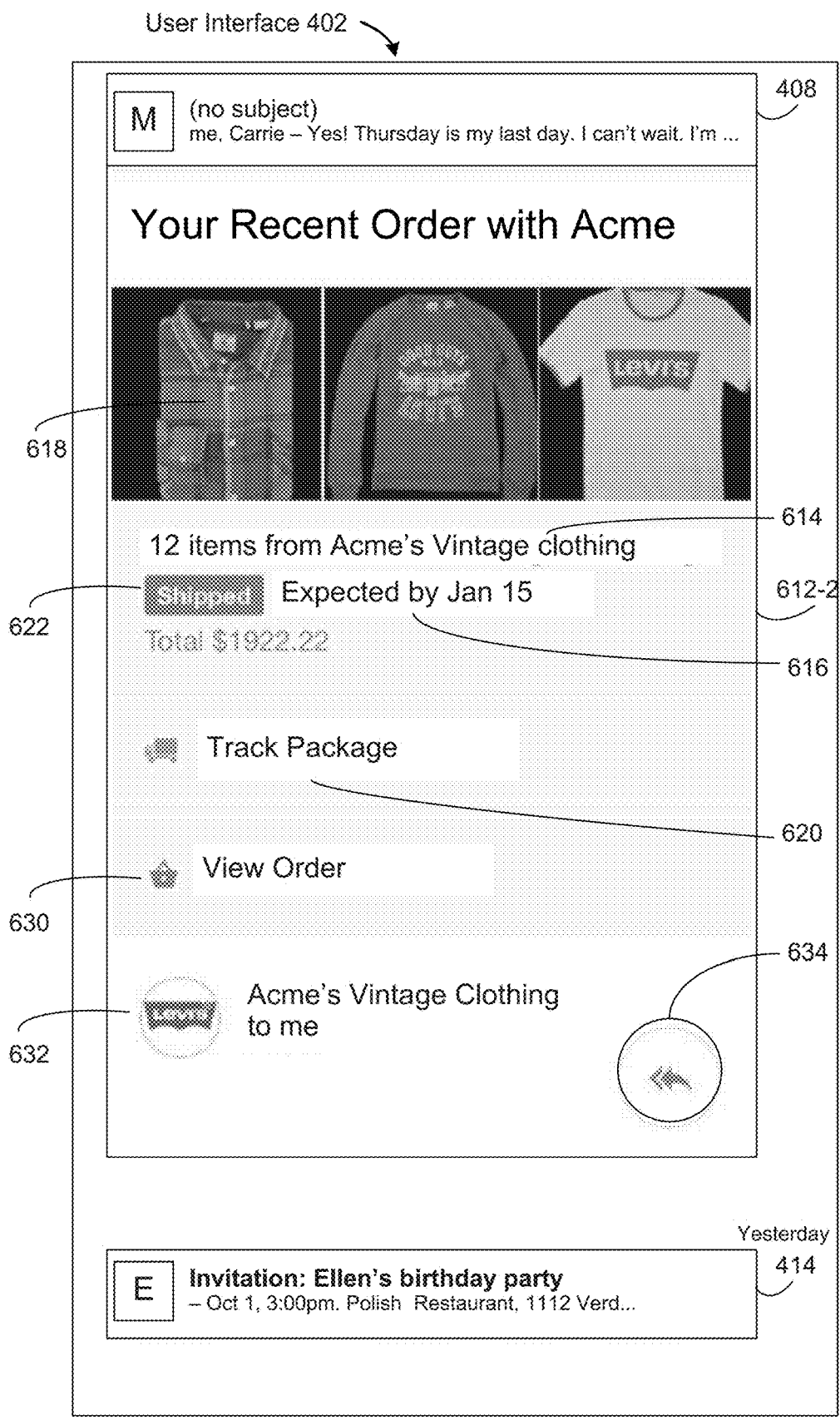

FIG. 4H illustrates the corresponding expanded display state of object 612. The expanded display state 612-2 includes the standard components of the expanded display state of an object representing a message that includes a first structured content item pertaining to purchases, in accordance with this example, including the number of items purchase 614, expected delivery date 616, an images 618 of items purchased (where such image are optionally from a source distinct from the message), the task of tracking 620 the package that contains the purchase, an indication 622 of the state of shipment of the package (again from a source distinct from the message). The expanded display state 612-2 further includes a view order task 630 and the original underlying message 632. A user can return to the corresponding collapsed display state 612-1 of FIG. 4G from expanded state 612-2 of FIG. 4H by selecting affordance 634.

Figure 4I:
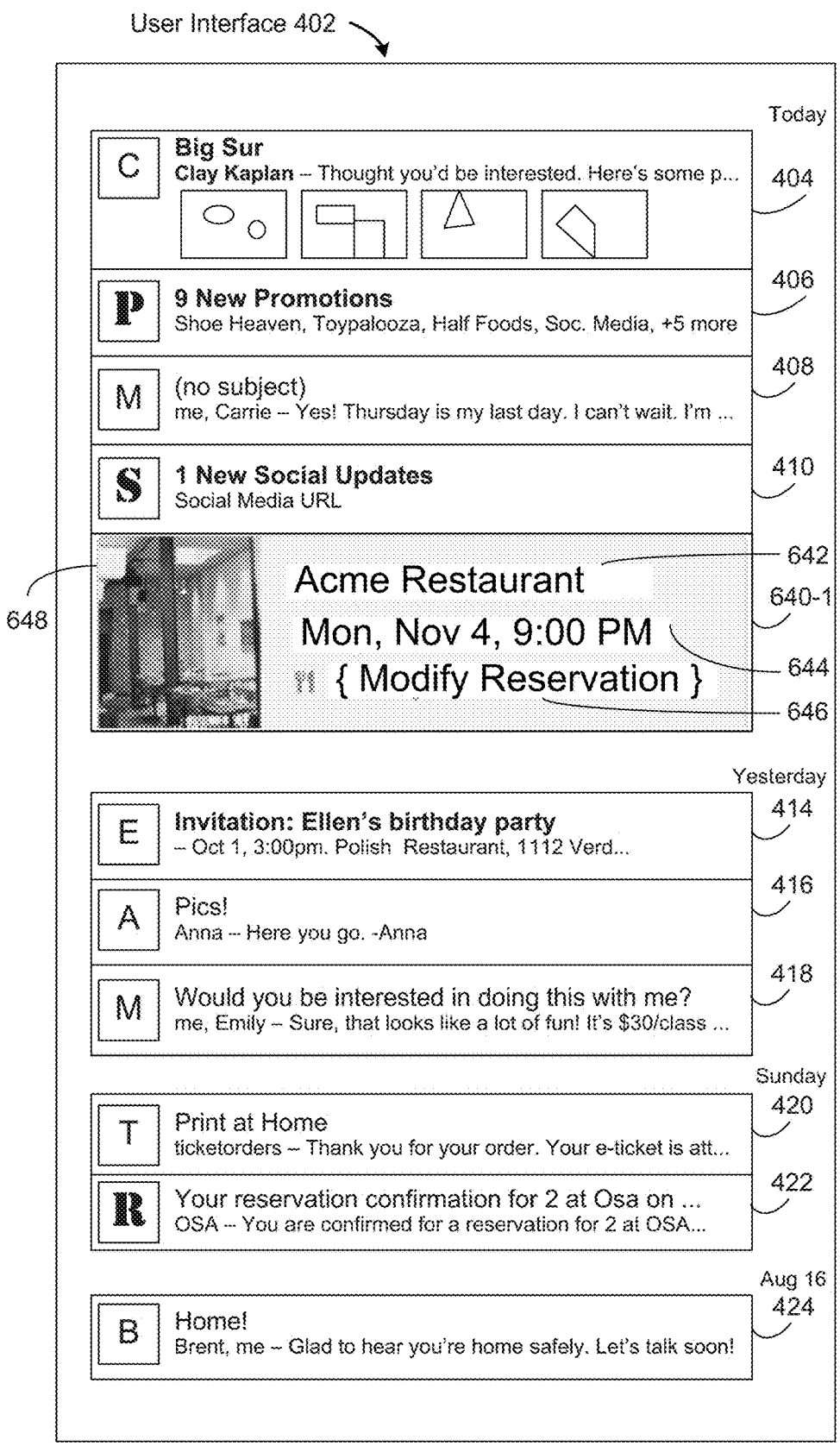

FIG. 4I illustrates a collapsed display state 640-1 of an object representing a message (not shown), addressed to a user, in which the first structured content element pertained to a restaurant reservation. When the first structured content element is found in the message, an action associated with the first structured content element is performed thereby obtaining content from a first data source that is distinct from the message. For instance, in the case of FIG. 4I, the first structured content element is an identification of a restaurant reservation and the data source is an image of the restaurant taken from a source distinct from the message. Here, when the message is determined to have the first structured content element, the restaurant reservation, this structured information (the name of the restaurant) is used as a basis to obtain the image of the restaurant from a data source that is distinct from the message, such as first data source 126. Accordingly, as described before, when a structured content element is found in a message and content received from the data source distinct from the message, a first display state of a first object representing at least the message is formed. The first display state of the first object comprises a combination of a notification of the message and the content that was retrieved from a data source that is distinct from the message (e.g., the picture of the restaurant). The user interface 402 is updated to reflect the addition of the object representing the message. As FIG. 4I illustrates, the first display state of object 640, denoted state 640-1, includes the name of the restaurant 642, the date and time of the reservation 644 covered by the reservation, and a link 646 to URL that allows modification of the reservation. Further, a picture of the restaurant 648 from a source distinct from the message is provided.

Figure 4J:
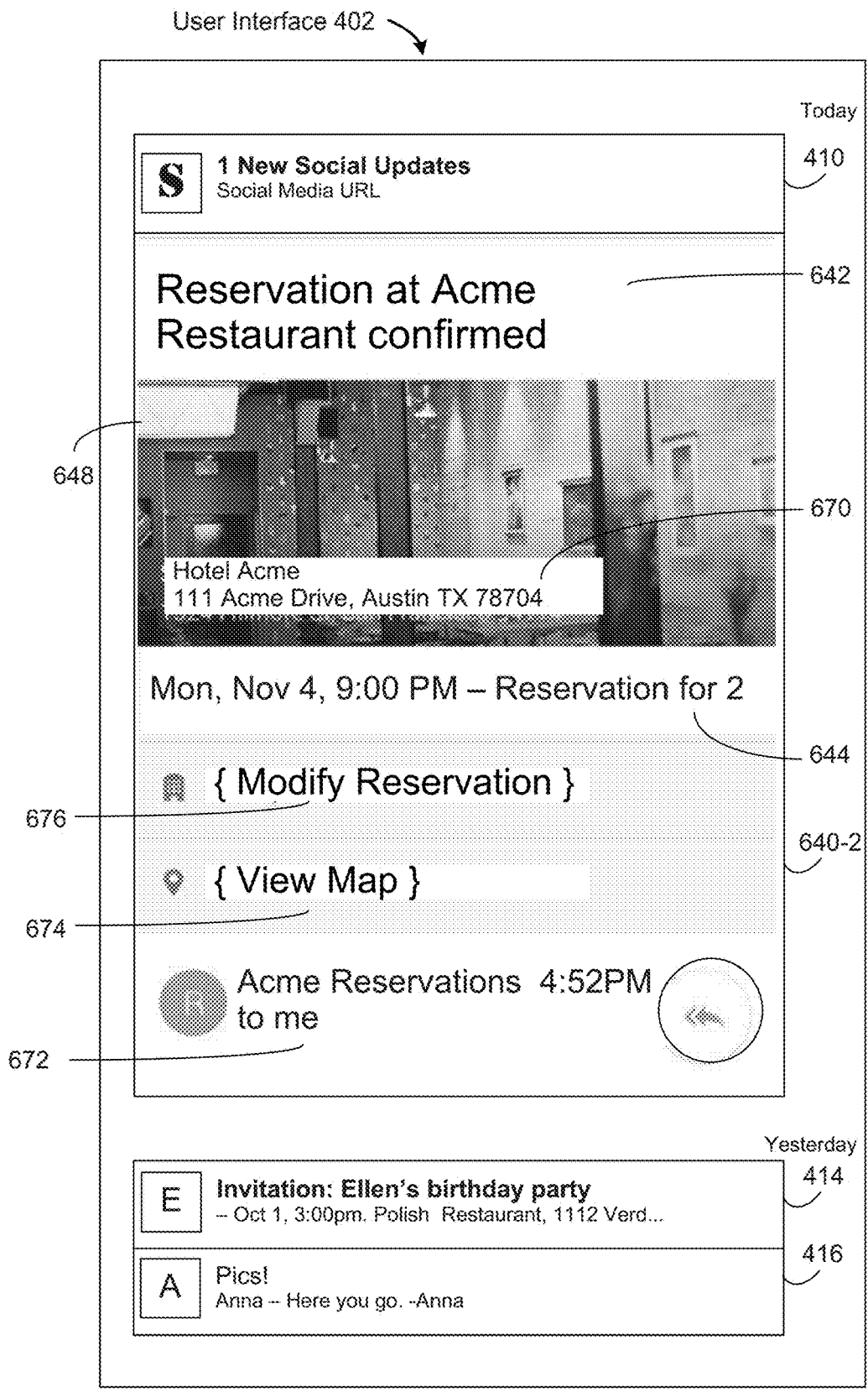

FIG. 4J illustrates a corresponding second expanded display state 640-2 of object 640 in which additional information such as the restaurant address 670, the message 672, and tasks associated with restaurant reservations (viewing a map of the restaurant 674 and modifying the hotel reservation 676) is illustrated. In some embodiments, such tasks are identified based on the identity of the structured content item identified in the first email (a restaurant reservation).

Figure 4K:
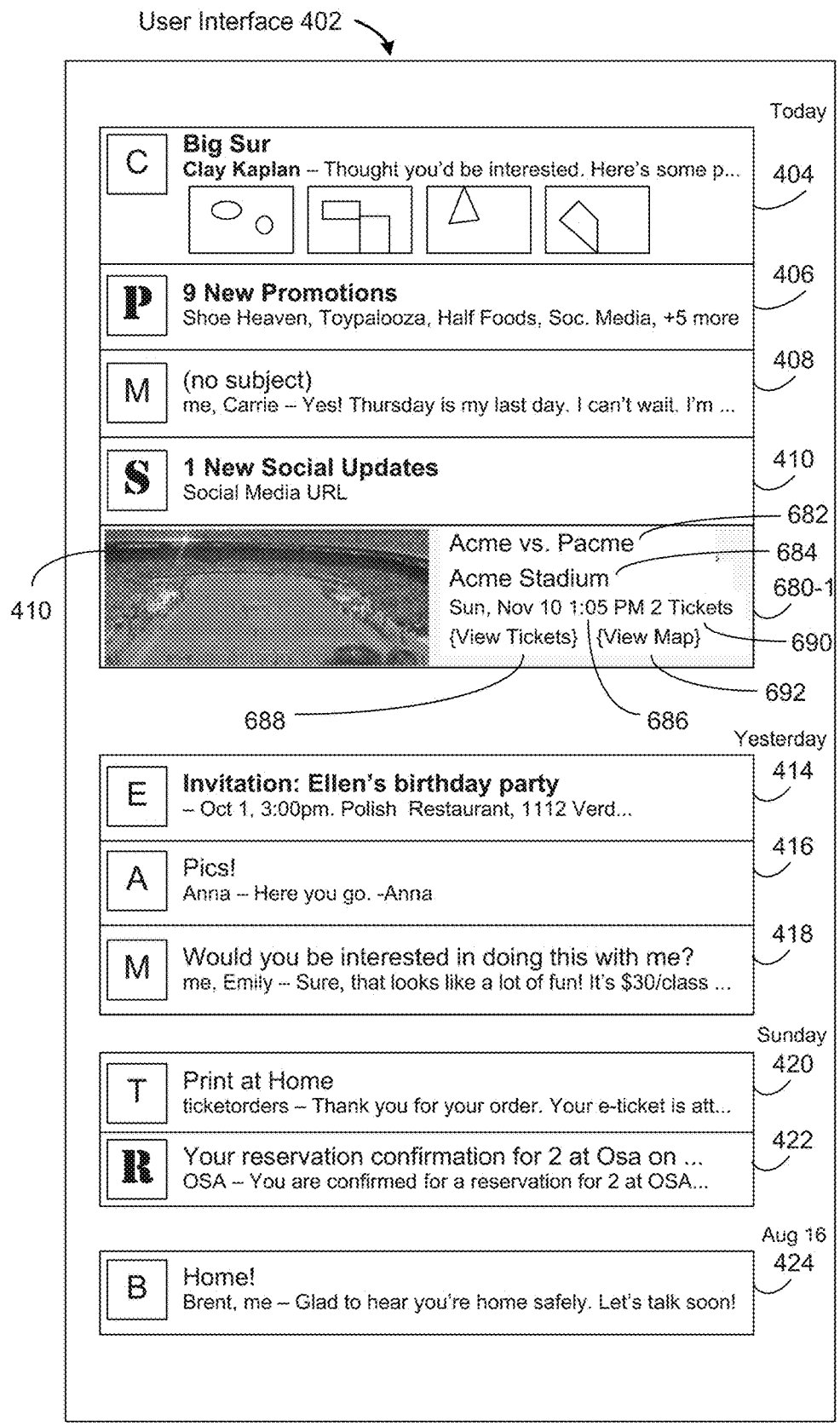
Figure 5A:
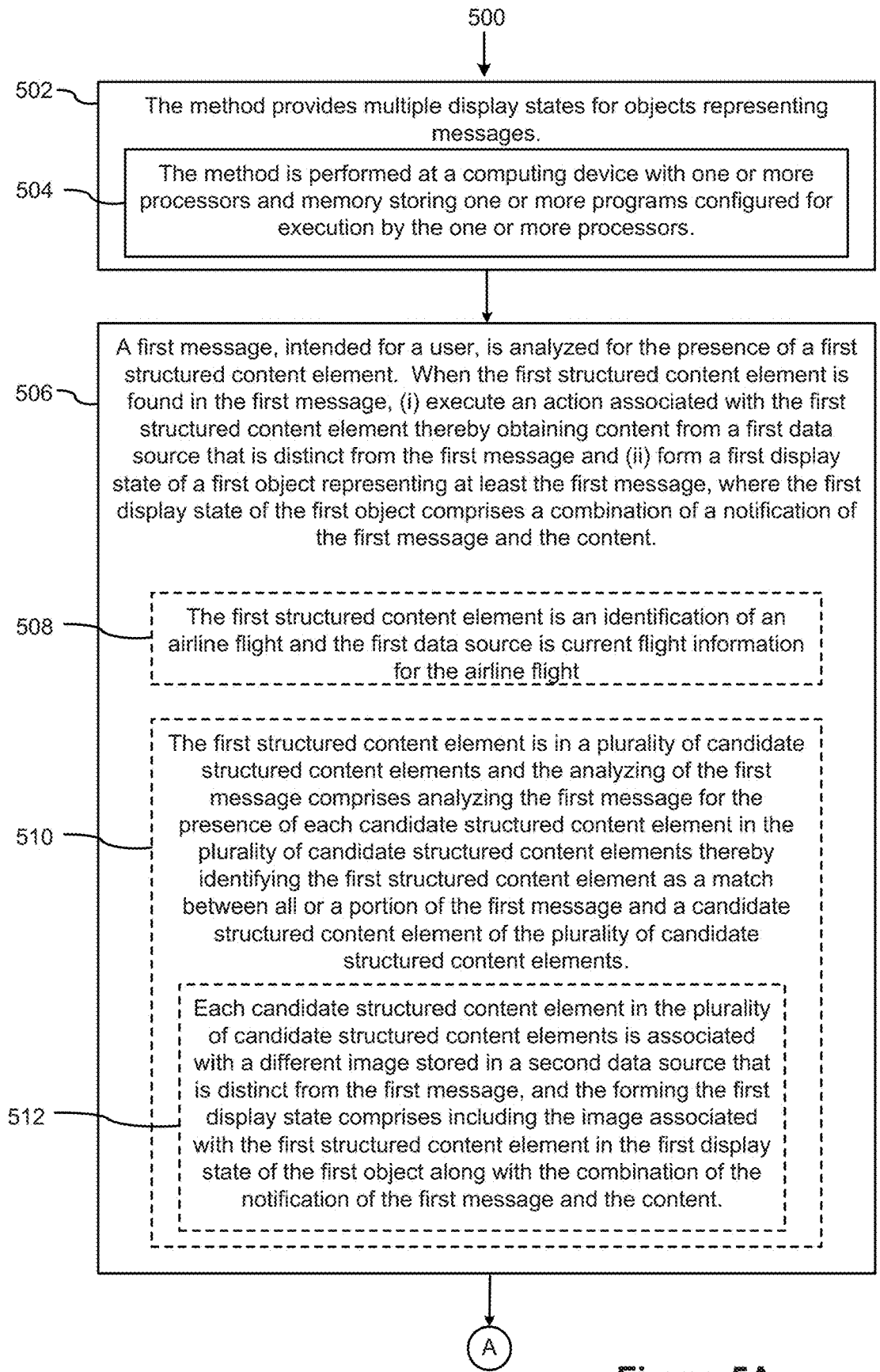
FIGS. 5A-5D provide a flowchart of a process for providing multiple display states for objects representing messages according to some implementations.
Figure 5B:
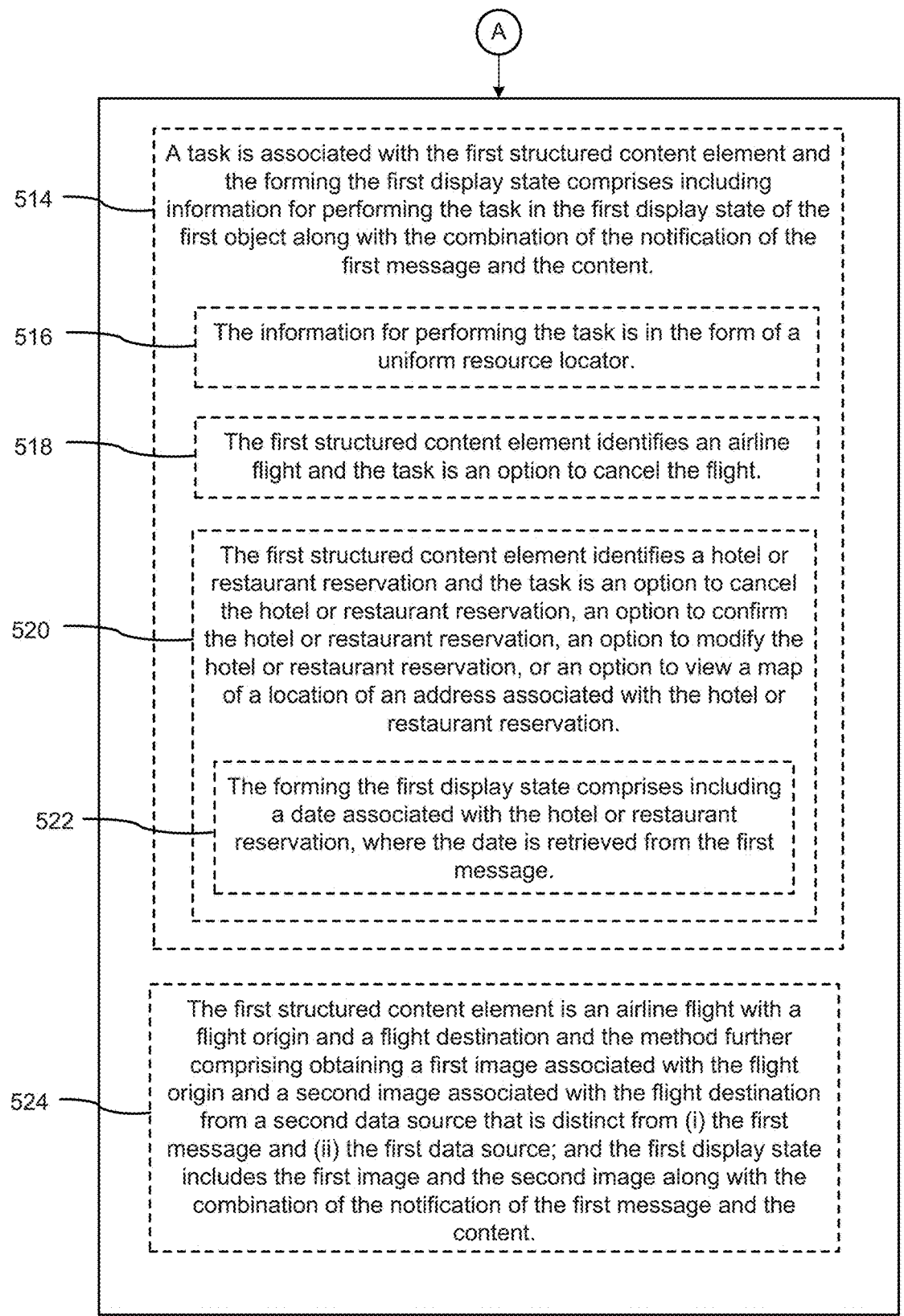
Figure 5C:
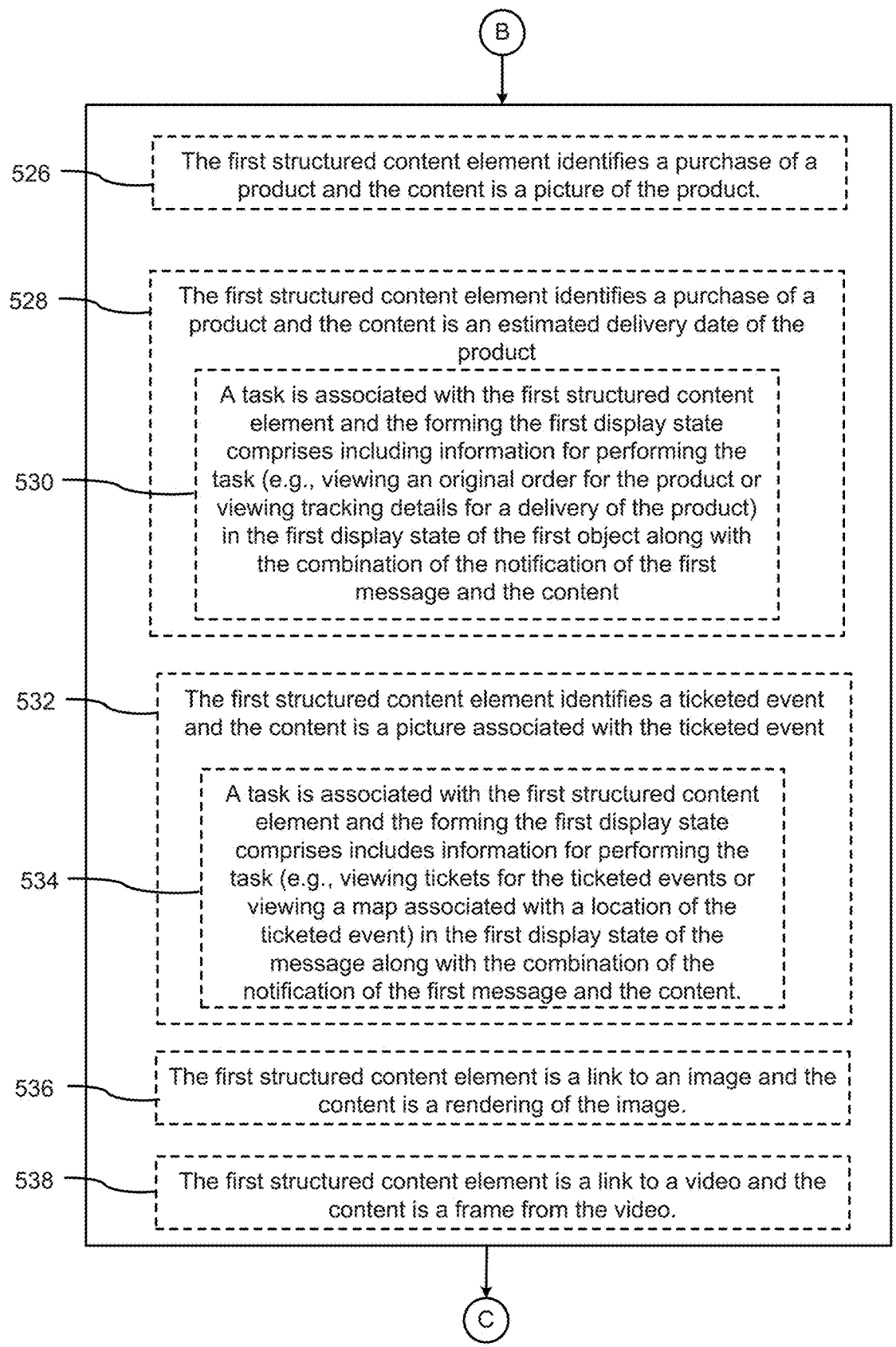
Figure 5D:
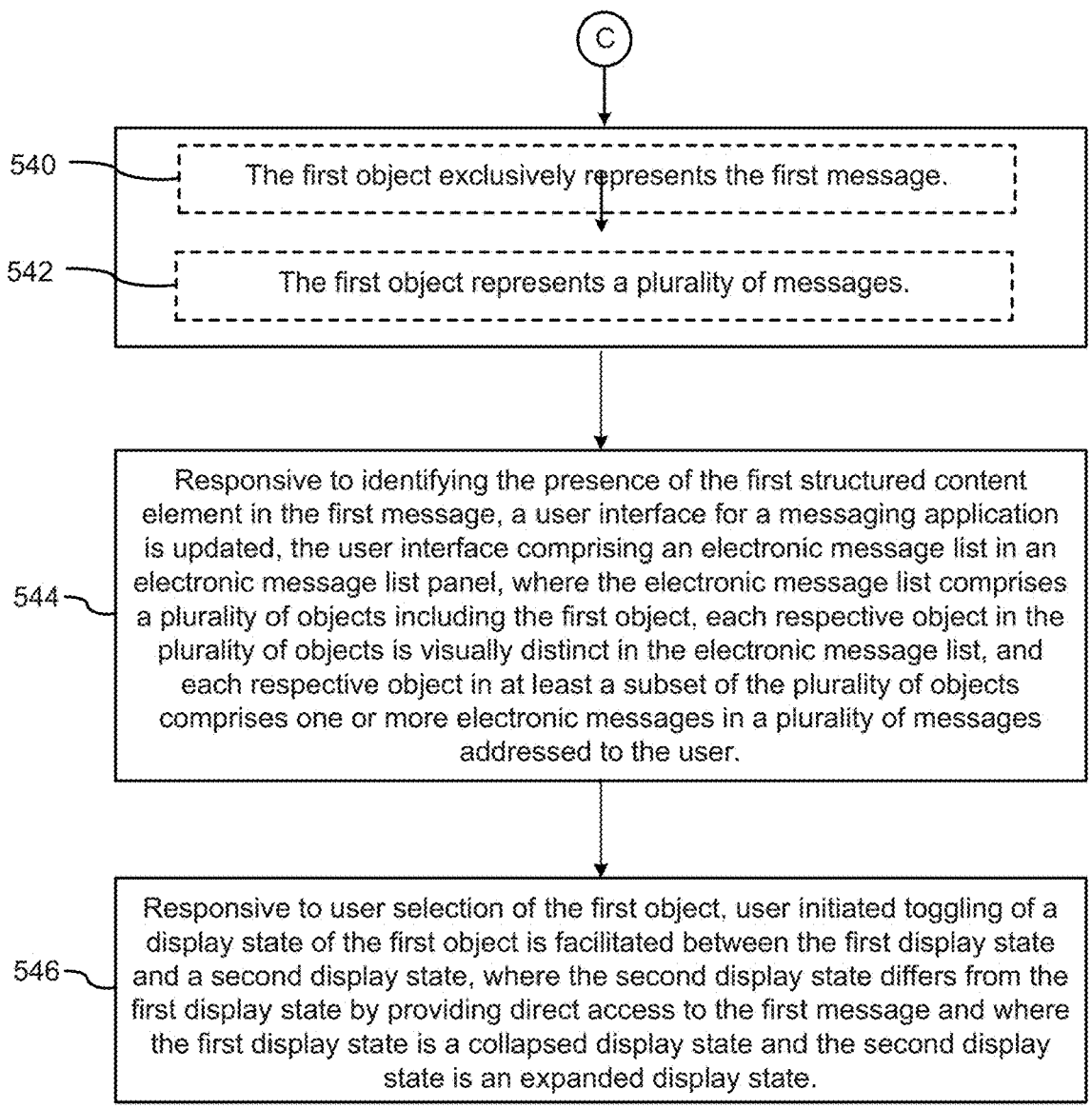

FIG. 4K illustrates a collapsed display state 680-1 of an object representing a message (not shown), addressed to a user, in which the first structured content element pertains to a ticket event. When the first structured content element is found in the message, an action associated with the first structured content element is performed thereby obtaining content from a first data source that is distinct from the message. For instance, in the case of FIG. 4K, the first structured content element is an identification of a ticketed event and the data source is an image of the restaurant taken from a source distinct from the message. Here, when the message is determined to have the first structured content element, the ticketed event, this structured information (the ticketed event) is used as a basis to obtain the image of the arena hosting the ticketed event from a data source that is distinct from the message, such as first data source 126. Accordingly, as described before, when a structured content element is found in a message and content received from the data source distinct from the message, a first display state of a first object representing at least the message is formed. The first display state of the first object comprises a combination of a notification of the message and the content that was retrieved from a data source that is distinct from the message (e.g., the picture of the arena or other forum hosting the ticketed event). The user interface 402 is updated to reflect the addition of the object representing the message. As FIG. 4K illustrates, the first (collapsed) display state of the object 680, denoted state 680-1, includes the name of the ticketed event 682, the name 684 of the arena or other forum hosting the ticketed event, the date and time 686 of the ticketed event date, the option to perform the task 688 of viewing the ticket, the number of tickets purchase 690, and the task 692 of viewing a map of the arena or other forum hosting the ticketed event.

Referring to FIG. 2, a display device 208 is inherently limited in size. Accordingly, the number of objects displayed in the user interface 402 is necessarily limited. Scrolling may be necessary for a user to get to a desired message. If the number of messages in the message list is small enough, all of the messages may be able to be displayed.

FIGS. 5A-5D provide a flowchart of a process 500, performed by a computing device, for providing multiple display states for objects representing messages (502). The method is performed (504) at a computing device 102 and/or 110 having one or more processors and memory. The memory stores (504) one or more programs configured for execution by the one or more processors.

A message, addressed to a user, is analyzed for the presence of a first structured content element. When the first structured content element is found in the message, a method is performed that comprises (i) executing an action associated with the first structured content element thereby obtaining content from a first data source that is distinct from the message and (ii) forming a first display state of a first object representing at least the message, where the first display state of the first object comprises a combination of a notification of the message and the content (506). In some embodiments, the first structured content element is an identification of an airline flight and the first data source is current flight information for the airline flight 508.

In some embodiments, the first structured content element is in a plurality of candidate structured content elements and the analyzing of the message comprises analyzing the message for the presence of each candidate structured content element in the plurality of candidate structured content elements thereby identifying the first structured content element as a match between all or a portion of the message and a candidate structured content element of the plurality of candidate structured content elements (510). In some such embodiments, each candidate structured content element in the plurality of candidate structured content elements is associated with a different image stored in a second data source that is distinct from the message, and the forming the first display state comprises including the image associated with the first structured content element in the first display state of the first object along with the combination of the notification of the message and the content (512).

In some embodiments, there is a task is associated with the first structured content element and the forming the first display state comprises including information for performing the task in the first display state of the first object along with the combination of the notification of the message and the content (514). In some embodiments, the information for performing the task is in the form of a uniform resource locator (516). In some embodiments, the first structured content element identifies an airline flight and the task is an option to cancel the flight (518). In some embodiments, the first structured content element identifies a hotel or restaurant reservation and the task is an option to cancel the hotel or restaurant reservation, an option to confirm the hotel or restaurant reservation, an option to modify the hotel or restaurant reservation, or an option to view a map of a location of an address associated with the hotel or restaurant reservation (520). In some such embodiments, the forming the first display state comprises including a date associated with the hotel or restaurant reservation, wherein the date is retrieved from the message (522).

In some embodiments, the first structured content element is an airline flight with a flight origin and a flight destination and the method further comprises obtaining a first image associated with the flight origin and a second image associated with the flight destination from a second data source that is distinct from (i) the message and (ii) the first data source; and the first display state includes the first image and the second image along with the combination of the notification of the message and the content (524).

In some embodiments, the first structured content element identifies a purchase of a product and the content is a picture of the product (526).

In some embodiments, the first structured content element identifies a purchase of a product and the content is an estimated delivery date of the product (528). In some such embodiments, there is a task is associated with the first structured content element and the forming the first display state comprises including information for performing the task (e.g., viewing an original order for the product or viewing tracking details for a delivery of the product) in the first display state of the first object along with the combination of the notification of the message and the content (530).

In some embodiments, the first structured content element identifies a ticketed event and the content is a picture associated with the ticketed event (532). In some such embodiments, a task is associated with the first structured content element and the forming the first display state comprises includes information for performing the task (e.g., viewing tickets for the ticketed events or viewing a map associated with a location of the ticketed event) in the first display state of the message along with the combination of the notification of the message and the content (534).

In some embodiments, the first structured content element is a link to an image and the content is a rendering of the image (536). In some embodiments, the first structured content element is a link to a video and the content is a frame from the video (538). In some embodiments, the first object exclusively represents the message (540). In some embodiments, the first object represents a plurality of messages (542).

Responsive to identifying the presence of the first structured content element in the message, a user interface for a messaging application is updated. The user interface comprises an electronic message list in an electronic message list panel. The electronic message list comprises a plurality of objects including the first object. Each respective object in the plurality of objects is visually distinct in the electronic message list. Further, each respective object in at least a subset of the plurality of objects comprises one or more electronic messages in a plurality of messages addressed to the user (544). Responsive to user selection of the first object, user initiated toggling of a display state of the first object is facilitated between the first display state and a second display state, where the second display state differs from the first display state by providing direct access to the message and where the first display state is a collapsed display state and the second display state is an expanded display state (546).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to best explain the principles of the invention and its practical applications, to thereby enable others skilled in the art to best utilize the invention and various implementations with various modifications as are suited to the particular use contemplated.

What is claimed is:

1. A method comprising:
   determining, by one or more processors of a computing device, whether a first message, addressed to a user, includes a first structured content element that includes an indication of an airline flight;
   responsive to determining that the first message includes the first structured content element:
     forming, by the one or more processors, a first display state of a first object representing at least the first message, wherein the first display state of the first object comprises a combination of a notification of the first message and current flight information from a first data source distinct from the first message; and
     updating, by the one or more processors, a user interface for a messaging application to include the first object in an electronic message list in an electronic message list panel, wherein the electronic message list comprises a plurality of objects including the first object; and
   responsive to user selection of the first object, toggling, by the one or more processors, a display state of the first object between the first display state and a second display state, wherein the second display state includes the current flight information from the first data source and the first message, wherein the second display state differs from the first display state by at least in part providing direct access to the first message, wherein the first display state is a collapsed display state for the first object presented within the messaging application, and the second display state is an expanded display state for the first object presented within the messaging application, wherein the first display state and the second display state are each configured to be used by the messaging application for displaying the first object, and wherein the current flight information provided by the second display state of the object includes additional flight information from the first data source compared to the current flight information provided by the first display state of the object.

2. The method of claim 1,
   wherein the first structured content element is in a plurality of candidate structured content elements, and
   wherein determining whether the first message includes the first structured content element comprises identifying the first structured content element as a match between all or a portion of the first message and a candidate structured content element of the plurality of candidate structured content elements.

3. The method of claim 2,
   wherein each candidate structured content element in the plurality of candidate structured content elements is associated with a respective image stored in a second data source that is distinct from the first message, and
   wherein forming the first display state further comprises including the respective image associated with the first structured content element in the first display state of the first object along with the combination of the notification of the first message and the current flight information.

4. The method of claim 1,
   wherein a task is associated with the first structured content element, and
   wherein the forming the first display state comprises including information for performing the task in the first display state of the first object along with the combination of the notification of the first message and the current flight information.

5. The method of claim 4, wherein the information for performing the task is in the form of a uniform resource locator.

6. The method of claim 4, wherein the task is an option to cancel the flight.

7. The method of claim 1,
   wherein the first structured content element further comprises a flight origin and a flight destination,
   wherein the method further comprises obtaining a first image associated with the flight origin and a second image associated with the flight destination from a second data source that is distinct from (i) the first message and (ii) the first data source, and
   wherein forming the first display state comprises including the first image and the second image in the first display state of the first object along with the combination of the notification of the first message and the current flight information.

8. The method of claim 1, wherein the first object exclusively represents the first message.

9. The method of claim 1, wherein the first object represents a plurality of messages.

10. The method of claim 1, wherein the first data source that is distinct from the first message is a second message addressed to the user.

11. A computing device, comprising:
one or more processors;
memory; and
one or more programs stored in the memory configured for execution by the one or more processors, the one or more programs comprising instructions for:
determining whether a first message, addressed to a user, includes a first structured content element that includes an indication of an airline flight;
responsive to determining that the first message includes the first structured content element:
forming a first display state of a first object representing at least the first message, wherein the first display state of the first object comprises a combination of a notification of the first message and current flight information from a first data source distinct from the first message; and
updating a user interface for a messaging application to include the first object in an electronic message list in an electronic message list panel, wherein the electronic message list comprises a plurality of objects including the first object; and
responsive to user selection of the first object, toggling a display state of the first object between the first display state and a second display state, wherein the second display state includes the current flight information from the first data source and the first message, wherein the second display state differs from the first display state by at least in part providing direct access to the first message, wherein the first display state is a collapsed display state for the first object presented within the messaging application, and the second display state is an expanded display state for the first object presented within the messaging application, the first display state and the second display state are each configured to be used by the messaging application for displaying the first object, and wherein the current flight information provided by the second display state of the object includes additional flight information from the first data source compared to the current flight information provided by the first display state of the object.

12. The computing device of claim 11,
wherein the first structured content element is in a plurality of candidate structured content elements, and
wherein the one or more programs comprise instructions for identifying the first structured content element as a match between all or a portion of the first message and a candidate structured content element of the plurality of candidate structured content elements.

13. The computing device of claim 12,
wherein each candidate structured content element in the plurality of candidate structured content elements is associated with a respective image stored in a second data source that is distinct from the first message, and
wherein the one or more programs comprise instructions for including the different image associated with the first structured content element in the first display state of the first object along with the combination of the notification of the first message and the current flight information.

14. The computing device of claim 12,
wherein a task is associated with the first structured content element, and
wherein the one or more programs comprise instructions for including information for performing the task in the first display state of the first object along with the combination of the notification of the first message and the current flight information.

15. The computing device of claim 14, wherein the information for performing the task is in the form of a uniform resource locator.

16. The computing device of claim 14, wherein the task is an option to cancel the flight.

17. The computing device of claim 11,
wherein the first structured content element further comprises a flight origin and a flight destination, and
wherein the one or more programs further comprise instructions for:
obtaining a first image associated with the flight origin and a second image associated with the flight destination from a second data source that is distinct from (i) the first message and (ii) the first data source, and
including the first image and the second image in the first display state of the first object along with the combination of the notification of the first message and the current flight information.

18. The computing device of claim 11, wherein the first object exclusively represents the first message.

19. The computing of claim 11, wherein the first data source that is distinct from the first message is a second message addressed to the user.

20. A computer readable medium storing one or more programs configured for execution by a computing device having one or more processors and memory, the one or more programs comprising instructions for:
determining whether a first message, addressed to a user, includes a first structured content element that includes an indication of an airline flight;
responsive to determining that the first message includes the first structured content element:
forming a first display state of a first object representing at least the first message, wherein the first display state of the first object comprises a combination of a notification of the first message and current flight information from a first data source distinct from the first message; and
updating a user interface for a messaging application to include the first object in an electronic message list in an electronic message list panel, wherein the electronic message list comprises a plurality of objects including the first object; and
responsive to user selection of the first object, toggling a display state of the first object between the first display state and a second display state, wherein the second display state includes the current flight information from the first data source and the first message, wherein the second display state differs from the first display state by at least in part providing direct access to the first message, wherein the first display state is a collapsed display state for the first object presented within the messaging application, and the second display state is an expanded display state for the first object presented within the messaging application, wherein the first display state and the second display state are each configured to be used by the messaging application for displaying the first object, and wherein the current flight information provided by the second display state of the object includes additional flight information from the first data source compared to the current flight information provided by the first display state of the object.

* * * * *